(12) United States Patent
Ibi et al.

(10) Patent No.: US 8,594,224 B2
(45) Date of Patent: Nov. 26, 2013

(54) TRANSMISSION METHOD, TRANSMISSION SYSTEM, TRANSMISSION DEVICE AND RECEPTION DEVICE

(75) Inventors: Shinsuke Ibi, Suita (JP); Seiichi Sampei, Suita (JP)

(73) Assignee: Osaka University, Osaka (JP)

( * ) Notice: Subject to any disclaimer, the term of this patent is extended or adjusted under 35 U.S.C. 154(b) by 1127 days.

(21) Appl. No.: 12/528,662

(22) PCT Filed: Jan. 31, 2008

(86) PCT No.: PCT/JP2008/051487
§ 371 (c)(1),
(2), (4) Date: Aug. 26, 2009

(87) PCT Pub. No.: WO2008/105214
PCT Pub. Date: Sep. 4, 2008

(65) Prior Publication Data
US 2010/0104041 A1   Apr. 29, 2010

(30) Foreign Application Priority Data

Feb. 28, 2007  (JP) .................................. 2007 050127

(51) Int. Cl.
*H04B 15/00* (2006.01)
(52) U.S. Cl.
USPC ............ 375/285; 375/254; 375/260; 455/509
(58) Field of Classification Search
USPC .......... 370/210, 329, 343, 475; 375/133, 254, 375/260, 285, 295, 347; 455/450, 509
See application file for complete search history.

(56) References Cited

U.S. PATENT DOCUMENTS

| | | | |
|---|---|---|---|
| 7,778,347 B2* | 8/2010 | Chen et al. | 375/295 |
| 2001/0001007 A1* | 5/2001 | Polley et al. | 375/254 |
| 2001/0024427 A1 | 9/2001 | Suzuki | |

(Continued)

FOREIGN PATENT DOCUMENTS

| | | |
|---|---|---|
| EP | 1 575 234 A2 | 9/2005 |
| EP | 1 653 646 A1 | 5/2006 |

(Continued)

OTHER PUBLICATIONS

European Examination Report issued in European patent application No. 06 704 238.8 on Jun. 11, 2012.

(Continued)

*Primary Examiner* — Leon-Viet Nguyen
(74) *Attorney, Agent, or Firm* — Birch, Stewart, Kolasch & Birch, LLP

(57) ABSTRACT

The DFT 12 converts a modulated digital signal into a spectrum of a frequency band. A use frequency band notification unit in a reception device notifies a transmission device 1 of a use frequency band. A deletion unit 141 in the transmission device 1 deletes a spectrum of a band other than the use frequency band after shaping of a spectrum waveform based on the water filling principal by a shaping unit 13. Then, a digital signal for each data series concerning the spectrum obtained after deletion by the deletion unit 141 is synthesized by a synthesizing unit 16 and sent from the transmission device 1 to the reception device. A reception side conversion unit in the reception device converts the digital signal sent by the transmission unit into a spectrum of a frequency band. A turbo equalization unit performs turbo equalization on the converted spectrum.

5 Claims, 23 Drawing Sheets

(56) References Cited

U.S. PATENT DOCUMENTS

| | | |
|---|---|---|
| 2006/0246916 A1 | 11/2006 | Cheng et al. |
| 2007/0117517 A1* | 5/2007 | Hui et al. ............... 455/67.11 |
| 2007/0177655 A1* | 8/2007 | Ktenas et al. ............ 375/144 |

FOREIGN PATENT DOCUMENTS

| | | |
|---|---|---|
| JP | 2001-238269 A | 8/2001 |
| WO | WO-86/07223 A1 | 12/1986 |
| WO | WO-2005/020489 A1 | 3/2005 |
| WO | WO-2006/011524 A1 | 2/2006 |
| WO | WO-2006/109492 A1 | 10/2006 |
| WO | WO 2007/055551 A1 | 5/2007 |

OTHER PUBLICATIONS

Hwang et al., "A Novel Channel Allocation and Scheduling Algorithm in OFDMA System", 2006 IEEE 64th Vehicular Technology Conference: VTC 2006-Fall, (2006) pp. 1-5.

Song et al., "Multi-user Subcarrier Allocation with Minimum Rate Requests for Downlink OFDM Packet Transmission", 2004 IEEE 59th Vehicular Technology Conference, VTC 2004-Spring: Towards a Global Wireless World, vol. 4, No. 17 (2004) pp. 1920-1924.

"3rd Generation Partnership Project; Technical Specification Group Radio Access Network: Physical layer aspects for evolved Universal Terrestrial Radio Access (UTRA) (Release 7)", 3GPP TR 25.814 V7.0.0 Jun. 2006, pp. 67-90.

Tadashi Matsumoto et al., "Turbo Equalization: Fundamentals and Information Theoretic Considerations", Institute of Electronics, Information and Communication Engineers transactions B vol. J90-B, No. 1, 2007, pp. 1-16.

Tad Matsumoto et al., "Adaptive Transmission With Single-Carrier Multilevel BICM", Proceedings of the IEEE, vol. 95, No. 12, Dec. 2007, pp. 2354-2367.

Extended European Search Report dated Nov. 29, 2010 for Application No. 08704238.8.

Miyauchi et al., "Turbo Equalization Combined Timing and Frequency Offsets Compensation in Uplink OFDMA Systems", Global Telecommunications Conference, 2006, Globecom '06. IEEE, IEEE, pp. 1-5, Nov. 1, 2006, XP031075872.

* cited by examiner

F I G. 1
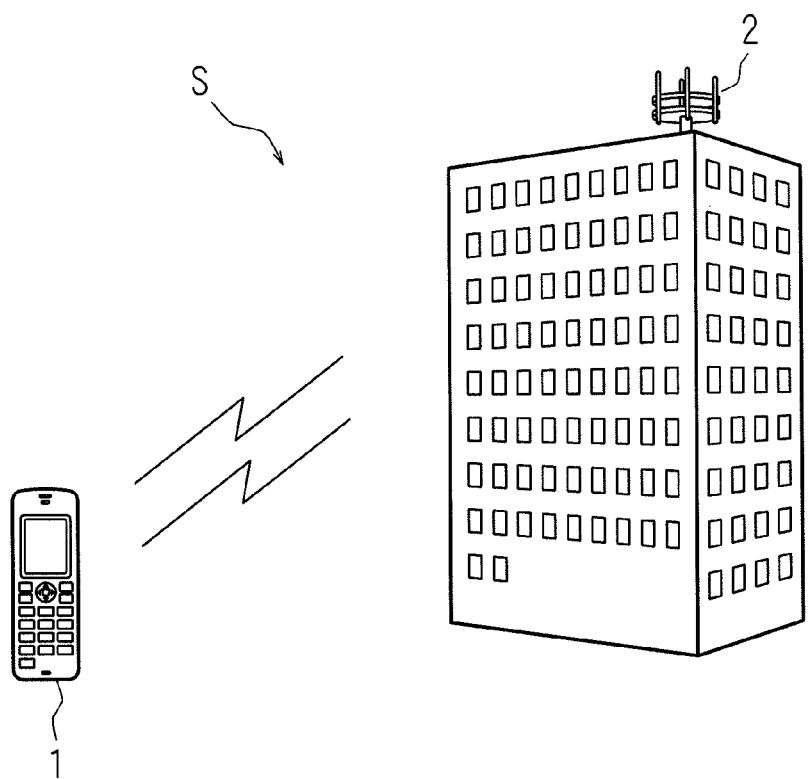

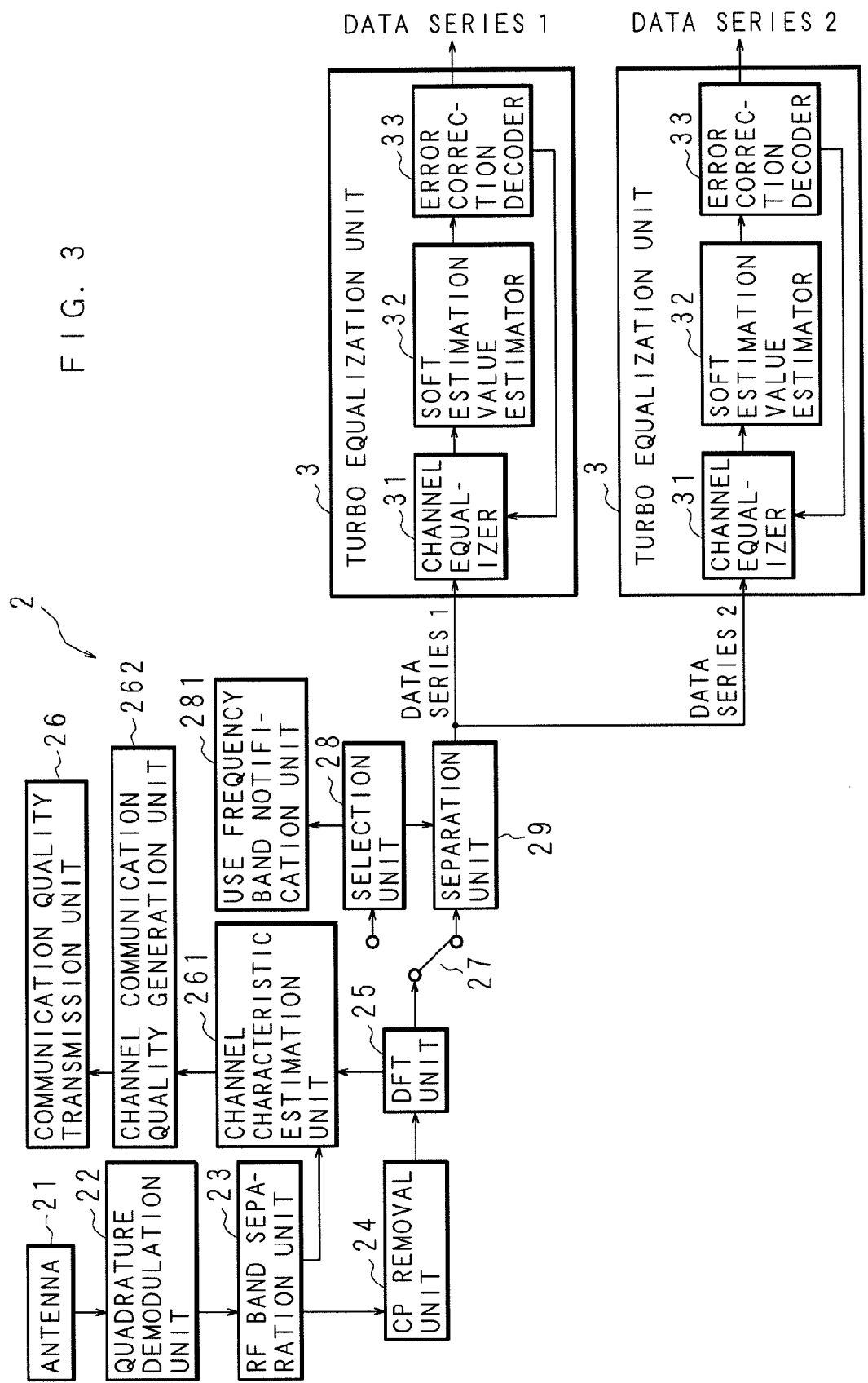

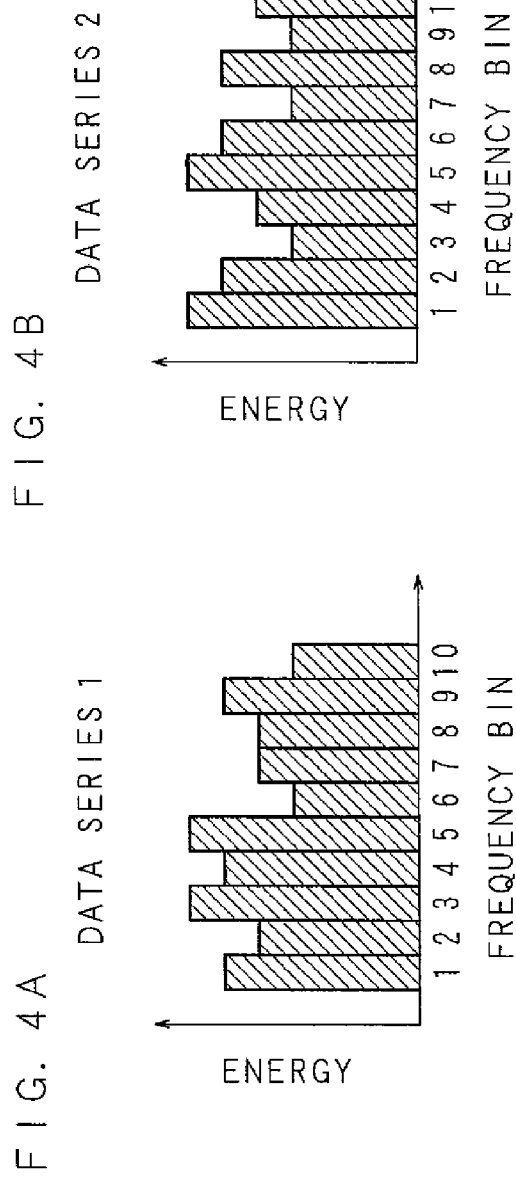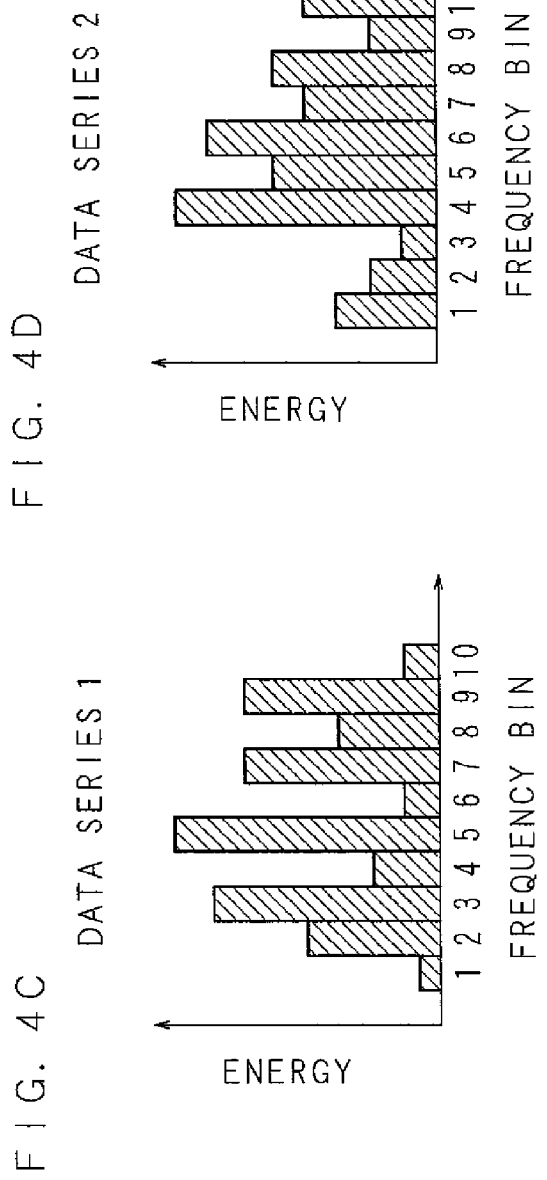

F I G. 6

| USE FREQUENCY BAND STORING UNIT | ~15 |
|---|---|
| | USE FREQUENCY BINS |
| DATA SERIES 1 | 2, 3, 5, 7, 9 |
| DATA SERIES 2 | 1, 4, 6, 8, 10 |

F I G. 2 0

PERCENTAGE STORING UNIT  ~35

| DELETION PERCENTAGE | MODULATION SCHEME | CODING RATE |
|---|---|---|
| ⋮ | ⋮ | ⋮ |
| DELETION PERCENTAGE 50% | BPSK | 1/4 |
| DELETION PERCENTAGE 25% | QPSK | 1/2 |
| ⋮ | ⋮ | ⋮ |

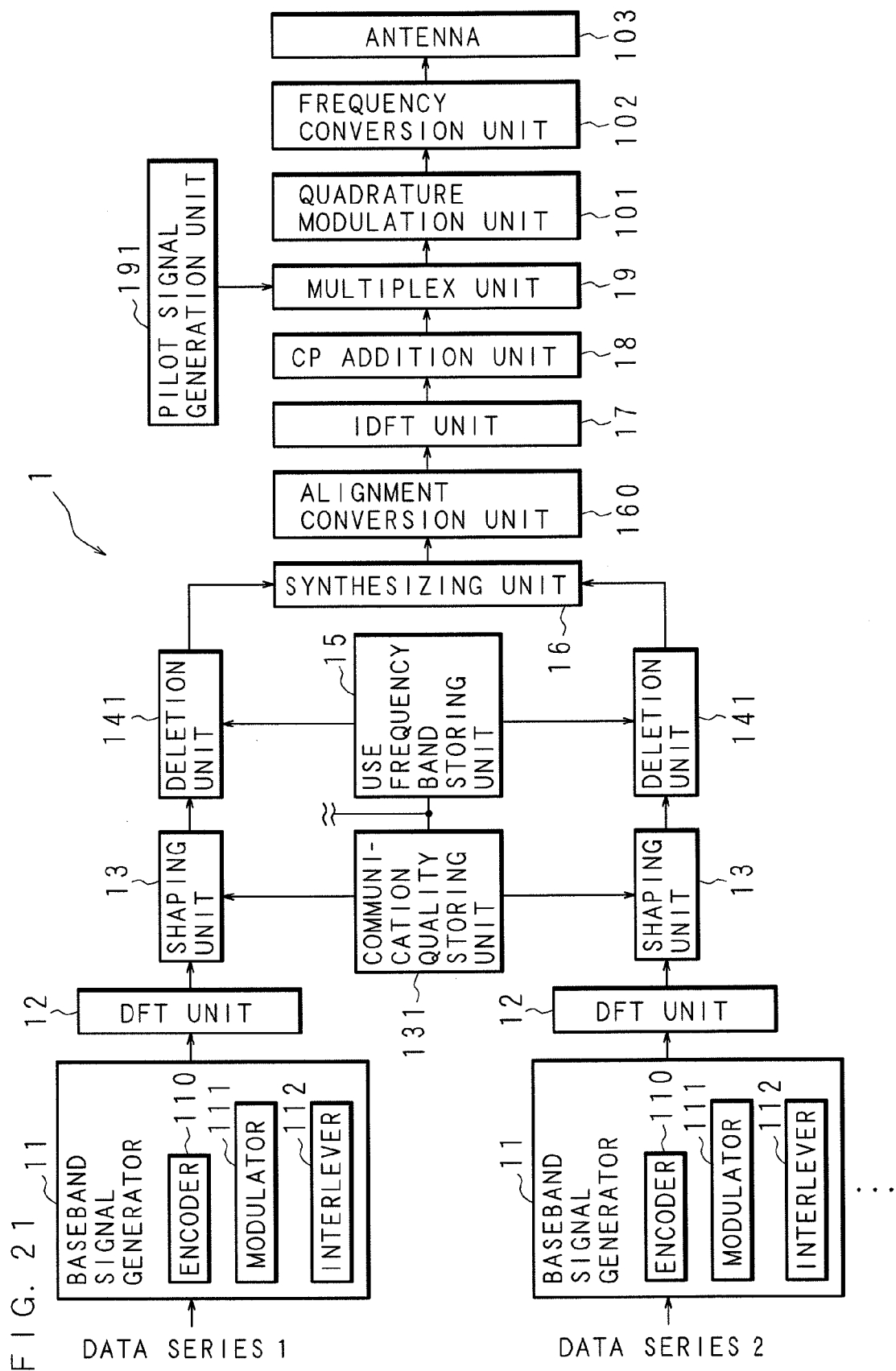

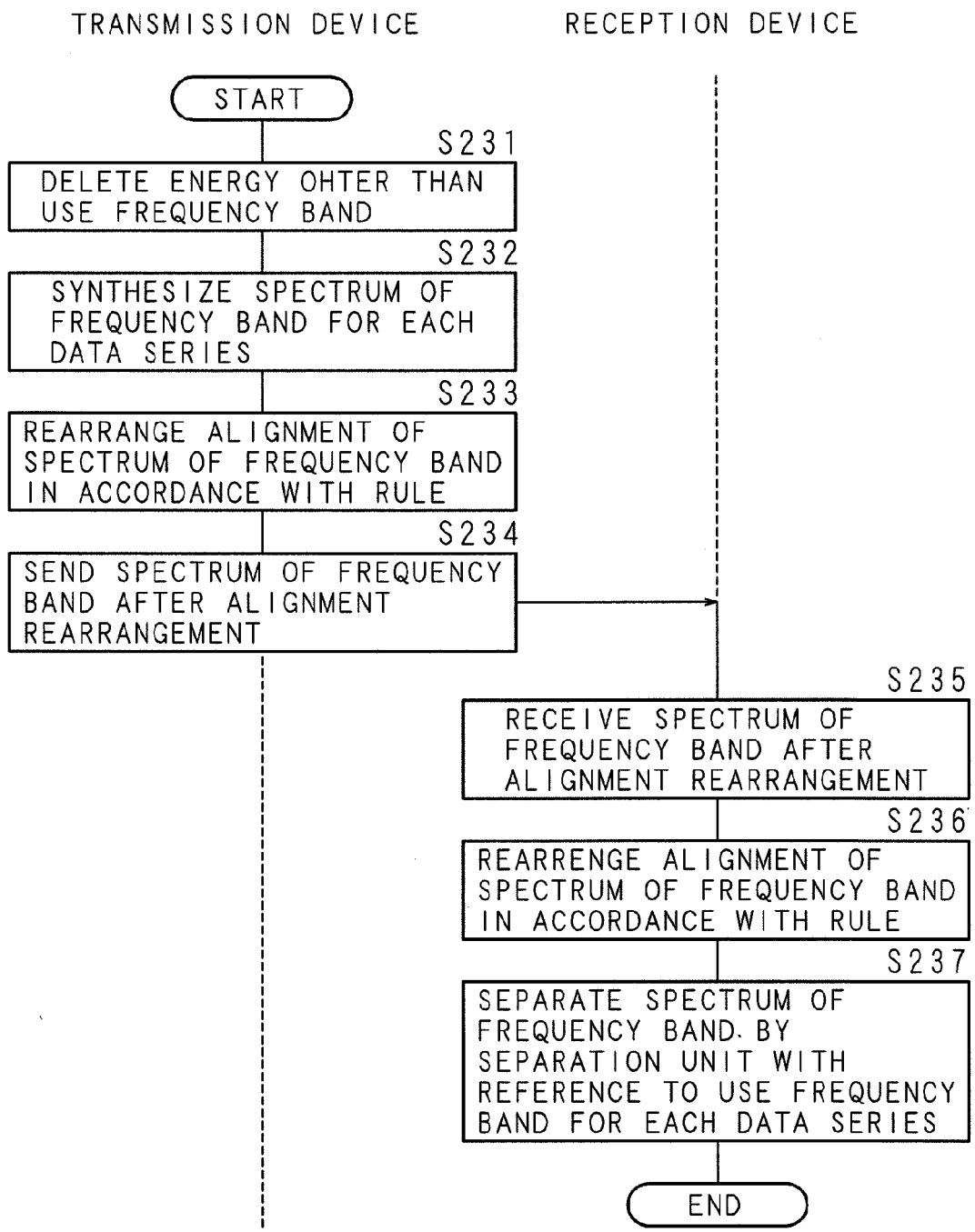

US 8,594,224 B2

TRANSMISSION METHOD, TRANSMISSION SYSTEM, TRANSMISSION DEVICE AND RECEPTION DEVICE

This application is the national phase under 35 U.S.C. §371 of PCT International Application No. PCT/JP2008/051487 which has an International filing date of Jan. 31, 2008 and designated the United States of America.

BACKGROUND OF THE INVENTION

1. Field of the Invention

The present invention relates to a transmission method, a transmission system, a transmission device and a reception device for sending a modulated digital signal from the transmission device to the reception device.

2. Description of Related Art

A plurality of wireless communication systems, e.g. a mobile phone, wireless Local Area Network (LAN), broadband wireless LAN such as Worldwide Interoperability for Microwave Access (WiMAX) and the like, have been in practical use. Increase of such wireless communication systems has caused a problem of shortage in available frequency resources. The problem is worse especially in a band of 6 GHz or lower which is densely used by mobile phones or the like. To solve the problem, researches concerning cognitive radio have been carried out.

The cognitive radio is a technical proposal for highly sharing a frequency among a plurality of wireless systems so as to aim for upgrading of wireless communication systems. The cognitive radio allows a wireless device such as a terminal, a base station or the like to have a functional capability of recognizing or cognizing surrounding radio wave environment. It is for a wireless device to select a frequency, a scheme and the like used in wireless communication for itself in accordance with the recognized or cognized radio wave environment to enhance the use efficiency of a frequency. This enables the user to receive the benefit of high speed data communication and stable communication services.

Moreover, in a transmission scheme for uplink in 3rd Generation Partnership Project (3GPP), Single Carrier transmission Frequency Division Multiple Access (SC-FDMA) has been considered as a technology for realizing effective use of a spectrum in an assigned band. For SC-FDMA, a technology of suitably inserting a 0 spectrum between spectra after Discrete Fourier Transform (DFT) has been proposed (see Non-Patent Document 1 for example).

SUMMARY OF THE INVENTION

All conventional technologies related to cognitive radio, however, use Orthogonal Frequency Division Multiplex (OFDM), which makes it difficult to be applied in the case where a mobile terminal acts as a transmission device, due to power consumption. Also, more effective utilization of a spectrum is required for 3GPP in 3rd Generation Partnership Project, Technical Specification Group Radio Access Network; Physical Layer Aspects for Evolved UTRA (Release 7), V7.0.0 2006-6 p 67-90.

The present invention has been made in view of such circumstances. An object of the present invention is to provide a transmission method, a transmission system, a transmission device and a reception device that are able to effectively utilize a frequency band and reduce a lowering of transmission efficiency occurring with interference, by deleting on purpose, in the transmission device, a spectrum of a band other than a use frequency band which is selected based on energy, and by providing the reception device with an equalization unit performing non-linear iterative equalization.

Another object of the present invention is to provide a transmission system or the like that is able to effectively utilize a frequency band by inserting a spectrum of a different data series or a different transmission device into a deleted frequency band.

Another object of the present invention is to provide a transmission system or the like that is able to expand a communication channel capacity for better transmission by shaping a spectrum in each frequency band.

Another object of the present invention is to provide a transmission system or the like that is able to send and receive information under the optimum transmission efficiency by changing a modulation scheme or a code rate to be optimum in accordance with a percentage of a use frequency band that is assigned to each data series or each transmission device.

Another object of the present invention is to provide a transmission system or the like that is able to enhance the security level by rearranging the alignment of a synthesized spectrum of each frequency band in accordance with a given rule.

A transmission method according to the present invention is characterized in that the transmission method for sending a modulated digital signal from a transmission device to a reception device comprises a converting step for converting the modulated digital signal into a spectrum of a frequency band by a conversion unit in said transmission device; a use frequency band notifying step for notifying the transmission device of a frequency band to be used from said reception device; a deleting step for deleting, by a deletion unit, a spectrum of a band other than the use frequency band notified by the use frequency band notifying step; a sending step for sending a digital signal for a spectrum obtained after deletion by the deletion step from said transmission device to said reception device; a reception side converting step for converting the digital signal sent by the sending step into a spectrum of a frequency band by a reception side conversion unit; and an equalizing step for performing non-linear iterative equalization, by an equalization unit, on the spectrum converted by the reception side converting step.

A transmission system according to the present invention is characterized in that the transmission system for sending a modulated digital signal from a transmission device to a reception device comprises a conversion unit converting the modulated digital signal into a spectrum of a frequency band in said transmission device; a use frequency band notification unit notifying the transmission device of a frequency band to be used from said reception device; a deletion unit deleting a spectrum of a band other than the use frequency band notified by the use frequency band notification unit; a transmission unit sending a digital signal for a spectrum obtained after deletion by the deletion unit from said transmission device to said reception device; a reception side conversion unit converting the digital signal sent by the transmission unit into a spectrum of a frequency band; and an equalization unit performing nonlinear iterative equalization on the spectrum converted by the reception side conversion unit.

The transmission system according to the present invention is characterized in that said reception device is configured to include a selection unit selecting a use frequency band for each data series based on energy distribution of a propagation channel frequency characteristic through which a plurality of data series sent from the transmission device pass, and said use frequency band notification unit is configured to notify said transmission device of the use frequency band for each data series selected by said selection unit.

The transmission system according to the present invention is characterized in that said transmission unit is configured to synthesize a spectrum for each data series obtained after deletion by said deletion unit and to send a digital signal for the synthesized spectrum from said transmission device to said reception device.

The transmission system according to the present invention is characterized in that said selection unit is configured to select a use frequency band for each data series in the order of decreasing energy based on the energy distribution of a propagation channel frequency characteristic, through which a plurality of data series sent from the transmission device pass, so as to avoid overlapping of a use frequency band to be selected among data series.

The transmission system according to the present invention is characterized in that said reception device is configured to include a selection unit selecting a use frequency band for each transmission device based on the energy of frequency bands sent from a plurality of transmission devices, and said use frequency band notification unit is configured to notify each of corresponding transmission devices of the use frequency band for each transmission device selected by said selection unit.

The transmission system according to the present invention is characterized in that said selection unit is configured to select a use frequency band for each transmission device in the order of decreasing energy among the energy of frequency bands sent from a plurality of transmission devices, so as to avoid overlapping of a use frequency band to be selected among the transmission devices.

The transmission system according to the present invention is characterized in that said reception device is configured to include a separation unit separating the spectrum of a frequency band converted by said reception side conversion unit, for each data series or for each transmission device, based on the use frequency band selected by said selection unit, and said equalization unit is configured to perform non-linear iterative equalization on the spectrum separated by said separation unit.

The transmission system according to the present invention is characterized in that the system further comprises a shaping unit performing shaping of the spectrum of each frequency band converted at said conversion unit, based on a communication status between the transmission device and the reception device.

The transmission system according to the present invention is characterized in that said shaping unit is configured to perform shaping using a water filling principal in which a larger energy of a spectrum of each frequency band converted at said conversion unit is distributed to a frequency band with better communication status between the transmission device and the reception device.

The transmission system according to the present invention is characterized in that the system further comprises a changing unit changing a modulation scheme or a coding rate in accordance with a percentage of a use frequency band to be assigned to each data series or each transmission device, selected by said selection unit.

The transmission system according to the present invention is characterized in that said transmission unit is configured to synthesize a spectrum for each data series, obtained after deletion by said deletion unit, to rearrange an alignment of the synthesized spectrum of each frequency band in accordance with a given rule, and to send a digital signal for the rearranged spectrum from said transmission device to said reception device, and that said separation unit is configured to rearrange the alignment of the spectrum of a frequency band converted by said reception side conversion unit in accordance with said given rule, and to separate the spectrum for each data series based on the use frequency band selected by said selection unit.

The transmission system according to the present invention is characterized in that said equalization unit is configured to perform turbo equalization with an interference prevention function by a soft canceller.

A transmission device according to the present invention is characterized in that the transmission device sending a modulated digital signal to the outside comprises a conversion unit converting the modulated digital signal into a spectrum of a frequency band; a use frequency band storing unit storing a use frequency band to be used among frequency bands; a deletion unit deleting a spectrum of a band other than the use frequency band stored in the use frequency band storing unit; and a transmission unit sending a digital signal for a spectrum obtained after deletion by the deletion unit to the outside.

The transmission device according to the present invention is characterized in that said use frequency band storing unit is configured to store a use frequency band for each data series selected from a plurality of data series, and said transmission unit is configured to synthesize a spectrum of each data series obtained after deletion by said deletion unit, and to send a digital signal for the synthesized spectrum from said transmission device to said reception device.

A reception device according to the present invention is characterized in that the reception device receiving a modulated digital signal from the outside comprises a selection unit selecting a use frequency band for each data series based on energy distribution of a propagation channel frequency characteristic through which a plurality of data series, sent from the outside, pass; a use frequency band notification unit notifying said transmission device of the use frequency band for each data series selected by the selection unit; a reception side conversion unit converting the digital signal sent from the outside into a spectrum of a frequency band; a separation unit separating the spectrum of a frequency band converted by said reception side conversion unit, for each data series, based on the use frequency band selected by said selection unit; and an equalization unit performing non-linear iterative equalization on the spectrum separated by the separation unit.

A reception device according to the present invention is characterized in that the reception device receiving modulated digital signals from a plurality of transmission devices comprises a selection unit selecting a use frequency band for each of the transmission devices based on the energy of frequency bands sent from the plurality of transmission devices; a use frequency band notification unit notifying each of corresponding transmission devices of the use frequency band for each of the transmission devices selected by the selection unit; a reception side conversion unit converting a digital signal sent from the outside into a spectrum of a frequency band; a separation unit separating the spectrum of a frequency band converted by said reception side conversion unit, for each transmission device, based on the use frequency band selected by said selection unit; and an equalization unit performing non-linear iterative equalization on the spectrum separated by the separation unit.

According to the present invention, the conversion unit converts the digital signal modulated at the transmission device into a spectrum of a frequency band. The use frequency band notification unit in the reception device notifies the transmission device of a frequency band to be used. The deletion unit in the transmission device deletes a spectrum of a band other than the use frequency band. The transmission unit then sends a digital signal for a spectrum obtained after deletion by the deletion unit from the transmission device to the reception device. The reception side conversion unit in the reception device converts the digital signal sent by the transmission unit into a spectrum of a frequency band. Finally, the equalization unit performs non-linear iterative equalization on the converted spectrum. The non-linear iterative equalization is, for example, turbo equalization. Moreover, turbo equalization with an interference prevention function by a soft canceller is performed.

According to the present invention, the selection unit in the reception device selects a use frequency band for each data series based on energy distribution of a propagation channel frequency characteristic through which a plurality of data series sent from the transmission unit pass. For example, the selection unit selects a use frequency band for each data series in the order of decreasing energy among the energy of frequency bands concerning a plurality of data series sent from the transmission device, so as to avoid overlapping of a use frequency band to be selected among the data series. The use frequency band notification unit then notifies the transmission device of the use frequency band for each data series selected by the selection unit. The transmission unit in the transmission device synthesizes a spectrum for each data series obtained after deletion by the deletion unit, and sends a digital signal for the synthesized spectrum from the transmission device to the reception device.

According to the present invention, the selection unit in the reception device selects a use frequency band for each transmission device based on the energy of frequency bands sent from a plurality of transmission devices. It selects a use frequency band for each of the transmission devices, for example, in the order of decreasing energy among the energy of frequency bands sent from the plurality of transmission devices, so as to avoid overlapping of a use frequency band to be selected among the transmission devices. The use frequency band notification unit then notifies each of corresponding transmission devices of the use frequency band for each transmission device selected by the selection unit.

According to the present invention, the separation unit in the reception device separates the spectrum of a frequency band converted by the reception side conversion unit, for each data series or each transmission device, based on the use frequency band selected by the selection unit. The equalization unit then performs non-linear iterative equalization on the spectrum separated by the separation unit.

According to the present invention, the shaping unit performs shaping of a spectrum using the water filling principal in which a larger energy of the spectrum of each frequency band converted at the conversion unit is distributed to a frequency band with a better connection status between the transmission device and the reception device.

According to the present invention, the changing unit changes a modulation scheme or a coding rate in accordance with a percentage of a use frequency band which is assigned to each data series or each transmission device, selected by the selection unit.

According to the present invention, the transmission unit synthesizes a spectrum for each data series, obtained after deletion by the deletion unit, and rearranges an alignment of the synthesized spectrum of each frequency band in accordance with a given rule. It then sends a digital signal for the rearranged spectrum from the transmission device to the reception device. The separation unit in the reception device rearranges the alignment of the spectrum of a frequency band, converted by the reception side conversion unit, in accordance with a given rule, and separates the spectrum for each data series based on the use frequency band selected by the selection unit.

According to the present invention, the transmission device is notified of a use frequency band. The deletion unit deletes a spectrum of a band other than the use frequency band. The equalization unit in the reception device performs non-linear iterative equalization on the converted spectrum. Accordingly, the deleted band may effectively be utilized for other data transmissions. Moreover, the spectrum of the deleted band is appropriately restored by non-linear iterative equalization.

According to the present invention, the selection unit in the reception device selects a use frequency band for each data series based on energy distribution of a propagation channel frequency characteristic through which a plurality of data series sent from the transmission device pass. The use frequency band notification unit then notifies the transmission device of the use frequency band for each data series selected by the selection unit. The transmission unit in the transmission device synthesizes the spectrum for each data series obtained after deletion by the deletion unit, and sends a digital signal for the synthesized spectrum from the transmission device to the reception device. Accordingly, a spectrum of another data series may be inserted into the band of the deleted spectrum without conflict, enabling efficient transmission. Moreover, in a transmission channel, if information on a use frequency band is unknown, such inserting performs a role of a key, enabling enhancement of the security level.

According to the present invention, the selection unit in the reception device selects a use frequency band for each transmission device based on the energy of frequency bands sent from a plurality of transmission devices. The use frequency band notification unit then notifies each of corresponding transmission devices of the use frequency band for each transmission device selected by the selection unit. Accordingly, a spectrum for another transmission device may be synthesized into a deleted band, enabling improvement in use efficiency for multi-users and enhancement of the security level.

According to the present invention, the separation unit in the reception device separates, for each data series or each transmission device, the spectrum of a frequency band converted by the reception side conversion unit, based on the use frequency band selected by the selection unit. The equalization unit then performs non-linear iterative equalization on the spectrum separated by the separation unit. Accordingly, the separated spectrum may be equalized for each data series or for each transmission device, obtaining a diversity effect of a frequency.

According to the present invention, the communication channel capacity is expanded by performing shaping of a spectrum by the shaping unit using the water filling principal or the like.

According to the present invention, the changing unit changes a modulation scheme or a coding rate in accordance with a use frequency band that is assigned to each data series or each transmission device by the selection unit. Hence, the transmission characteristic changes in accordance with a percentage of the use frequency band, while the modulation scheme or the coding rate changes along therewith. Thus, transmission and reception of information under the optimal transmission efficiency may become possible by changing the modulation scheme or the coding rate in accordance with the percentage of the use frequency band. Moreover, occurrence of an error may be reduced even if the repetition of equalization increases.

According to the present invention, the transmission unit synthesizes the spectrum for each data series obtained after deletion by the deletion unit, and rearranges the alignment of the synthesized spectrum of each frequency band in accordance with a given rule. Then, a digital signal for the rearranged spectrum is sent from the transmission device to the reception device. The separation unit in the reception device rearranges the alignment of the spectrum of a frequency band converted by the reception side conversion unit in accordance with a given rule, and separates the spectrum for each data series based on the use frequency band selected by the selection unit. The present invention thus produces a significant effect in that, for example, the key characteristic of a use frequency band and the collaborative function of the rearrangement process enables further enhancement of the security level.

The above and further objects and features will more fully be apparent from the following detailed description with accompanying drawings.

BRIEF DESCRIPTION OF THE DRAWINGS

FIG. 1 is an explanatory drawing illustrating an overview of a transmission system.

FIG. 3 is a block diagram illustrating the hardware configuration of a reception device.

FIGS. 4A to 4D shows graphic charts illustrating images of a shaping process.

FIG. 6 is an explanatory drawing illustrating a record layout of a use frequency band storing unit.

FIG. 20 is an explanatory drawing illustrating a record layout of a percentage storing unit.

FIG. 21 is a block diagram illustrating the hardware configuration of a transmission device according to Embodiment 4.

FIG. 23 is a flowchart illustrating the procedure of a rearranging process.

DESCRIPTION OF THE PREFERRED EMBODIMENTS

Embodiment 1

Figure 2:
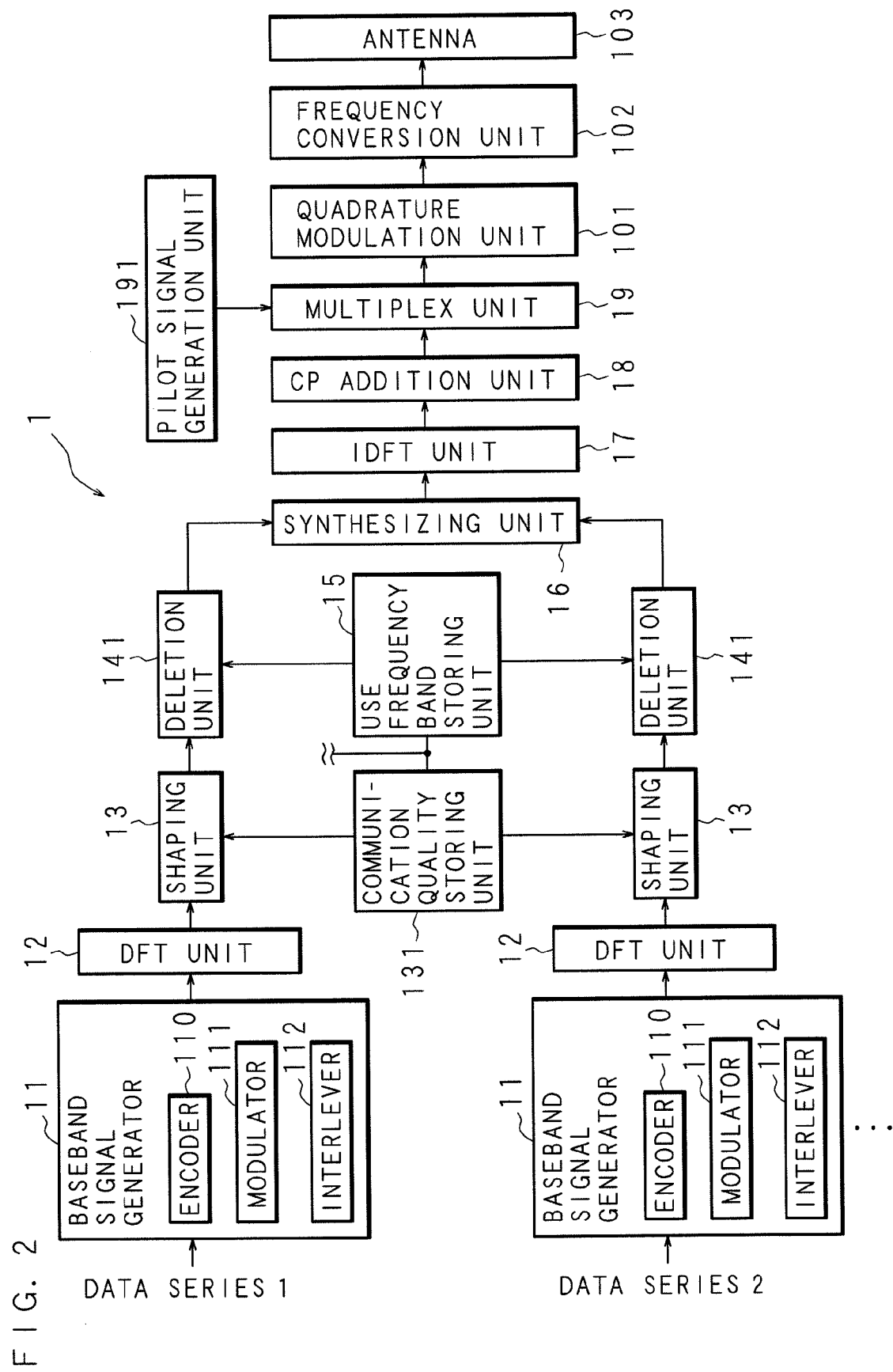
FIG. 2 is a block diagram illustrating the hardware configuration of a transmission device.

An embodiment of the present invention is described below with reference to the drawings. FIG. 1 is an explanatory drawing illustrating an overview of a transmission system. In the drawing, a transmission system represented by S is configured including a transmission device 1 and a reception device 2. In the description below, the transmission device 1 is applied to a mobile phone and the reception device 2 is a base station for the mobile phone, for example. It is noted that they are not limited to the form of a mobile phone and a base station, and may also be applied to communication between a wireless LAN adaptor and a wireless LAN router for a computer, communication between a wireless LAN adaptor in a home electric appliance and a wireless LAN router in a home server and the like.

FIG. 2 is a block diagram illustrating the hardware configuration of the transmission device 1, and FIG. 3 is a block diagram illustrating the hardware configuration of the reception device 2. First, the transmission device 1 is described. The transmission device 1 is configured including a baseband signal generator 11, a Discrete Fourier Transform (DFT) unit 12, a shaping unit 13, a deletion unit 141, a communication quality storing unit 131, a use frequency band storing unit 15, a synthesizing unit 16, a pilot signal generation unit 191, an Inverse Discrete Fourier Transform (IDFT) unit 17, a Cyclic Prefix (CP) addition unit 18, a multiplex unit 19, a quadrature modulation unit 101, a frequency conversion unit 102, an antenna 103 and the like. A shaping process by the shaping unit 13 and a deleting process by the deletion unit 141 are performed on a plurality of data series (data series 1, data series 2, data series 3, . . . , data series n), which are then synthesized and sent to the reception device 2 via the antenna 103. An example wherein the data series 1 and data series 2 are used will be described below to facilitate explanation.

Digital signals in the data series 1 and the data series 2 are input to the baseband signal generators 11, 11, respectively. The baseband signal generator 11 is configured including an encoder 110, a modulator 111 performing modulation such as Quadrature Phase Shift Keying (QPSK), Binary Phase Shift Keying (BPSK), Quadrature Amplitude Modulation (QAM) or the like, and an interleaver 112. By passing through the baseband signal generator 11, a transmission symbol vector $s=[s(1), s(2), \ldots, s(K)]^T$ is generated. The generated transmission symbol vector is input to the DFT unit 12 which acts as a conversion unit.

The DFT unit 12 performs time to frequency conversion to output a spectrum of a frequency band to the shaping unit 13. If a transmission symbol vector of a frequency band is $s^f$, $s^f$ may be represented by the formula (1) below.

$$s^f = Fs \qquad (1)$$
$$= [s^f(1), s^f(2), \ldots, s^f(K)]^T$$

Here, K is the length of data symbol series, while F is a discrete Fourier transform with a matrix size of K×K. The spectrum output from the DFT unit 12 is input to the shaping unit 13. The shaping unit 13, which is connected to the communication quality storing unit 131, performs shaping of the energy for a spectrum of each frequency band based on the communication status between the transmission device 1 and the reception device 2. The communication quality storing unit 131 stores therein information on communication quality between the transmission device 1 and the reception device 2, which is received from the reception device 2 or a different server computer (not shown), and outputs information on the communication quality to the shaping unit 13. It is noted that the information on communication quality is multiplexed as various control information within a transmission signal sent from the reception device 2. In addition, information on communication quality may also be regularly downloaded at an appropriate timing via a mobile phone network such as i-mode (registered trademark) or the like, or via Web services.

The shaping unit 13 performs shaping using, for example, the water filling principal wherein a larger energy of the spectrum in each frequency band converted at the DFT unit 12 is distributed to a frequency band with a better communication status between the transmission device 1 and the reception device 2. Specifically, a spectral mask matrix M is generated at the shaping unit 13 based on the information on communication quality output from the communication quality storing unit 131. The shaping unit 13 then performs spectral shaping according to the formula (2).

$$s^f_{map} = M s^f \qquad (2)$$

Here, M is a diagonal matrix with the matrix size of K×K, representing a shaping rule on the frequency axis, which is calculated in accordance with the water filling principal, the matrix having a diagonal component of 0 or a weight for energy distribution. FIG. 4 shows graphic charts illustrating images of the shaping process. In FIG. 4, the vertical axis indicates energy (spectral power level), while the horizontal axis indicates frequency bins by which frequency is divided for each of given bands. It is noted that an example is described below wherein a frequency band is classified into frequency bins 1 to 10 to facilitate explanation.

FIG. 4A is a graphical chart illustrating a change in the energy for a frequency before shaping in the data series 1, whereas FIG. 4B is a graphical chart illustrating a change in the energy for a frequency before shaping in the data series 2. In each data series, the energy changes in accordance with the frequency bins. The energy is optimally distributed by passing through the shaping unit 13. FIG. 4C is a graphical chart illustrating a change in the energy for a frequency after shaping in the data series 1, whereas FIG. 4D is a graphical chart illustrating a change in the energy for a frequency after shaping in the data series 2. It can be seen that the energy for each frequency bin has increased and decreased in each of the data series 1 and 2, showing that energy distribution has been performed among the frequency bins.

Thus shaped spectrum is input to the deletion unit 141 illustrated in FIG. 2. The deletion units 141, 141 are connected with the use frequency band storing unit 15. The use frequency band storing unit 15 stores therein a frequency band to be used in each data series. The use frequency band is decided by an algorithm, which will be described later, in the reception device 2. The transmission device 1 is notified of the decided use frequency band and stores the use frequency band in the use frequency band storing unit 15. It is noted that information on a use frequency band has been multiplexed as various control information within a transmission signal sent from the reception device 2. In addition, information on a use frequency band may also be regularly downloaded at an appropriate timing via the reception device 2 or a server computer (not illustrated) through a mobile phone network such as i-mode (registered trademark) or the like, or through Web services.

The deletion unit 141 deletes the spectrum (energy) in a band other than the use frequency band in accordance with the use frequency band output from the use frequency band storing unit 15. In the example described above, the use frequency band storing unit 15 stores a frequency bin to be used (hereinafter referred to as a use frequency bin), while the deletion unit 141 deletes a spectrum in a frequency bin to be deleted (hereinafter referred to as a delete frequency bin) other than the use frequency bin.

Figure 5A:
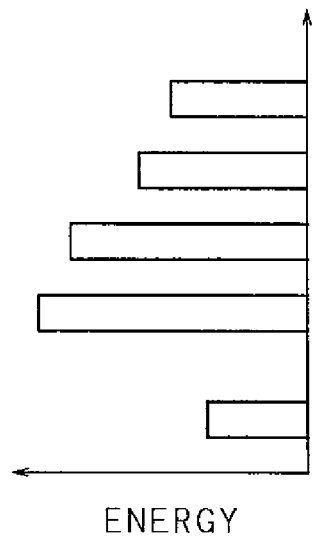
FIGS. 5A to 5C shows graphic charts illustrating images of a deleting process in a deletion unit and a synthesizing process in a synthesizing unit.
Figure 5B:
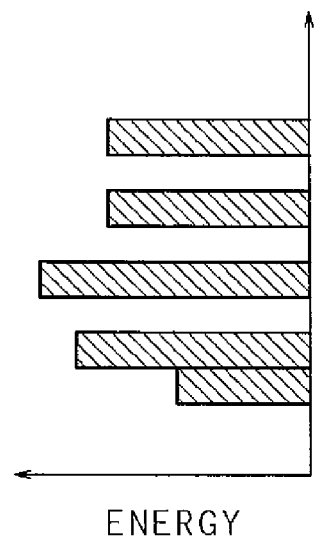

FIG. 5 shows graphic charts illustrating images of a deleting process in the deletion unit 141 and a synthesizing process in the synthesizing unit 16, whereas FIG. 6 is an explanatory drawing illustrating a record layout of the use frequency band storing unit 15. As in FIG. 4, the horizontal axis indicates frequency bins, while the vertical axis indicates energy. FIG. 5A is a graphic chart illustrating a change in the energy for the frequency bins after deletion of the spectrum in the data series 1 by the deletion unit 141, whereas FIG. 5B is a graphic chart illustrating a change in the energy for the frequency bins after deletion of the spectrum in the data series 2 by the deletion unit 141.

The use frequency band storing unit 15 in FIG. 6 stores therein use frequency bins for each data series. For use frequency bins, different use frequency bins are assigned to each data series so as to avoid conflict of use frequency bins between data series. For example, the data series 1 has the use frequency bins 2, 3, 5, 7 and 9, while the data series 2 has the use frequency bins 1, 4, 6, 8 and 10, which correspond to the delete frequency bins for the data series 1. As illustrated in FIG. 5A, the deletion unit 141 on the data series 1 side refers to the use frequency bins for the data series 1 stored in the use frequency band storing unit 15 to delete the spectra of the delete frequency bins 1, 4, 6, 8 and 10, such that the energy in the delete frequency bins will be 0.

Likewise, the deletion unit 141 on the data series 2 side, as illustrated in FIG. 5B, refers to the use frequency bins for the data series 2 stored in the use frequency band storing unit 15 to delete the spectra of the delete frequency bins 2, 3, 5, 7 and 9, such that the energy in the delete frequency bins will be 0. Though the use frequency band for each data series is stored in the use frequency band storing unit 15 in the present embodiment, it is understood that the frequency band to be deleted may be stored instead.

Figure 5C:
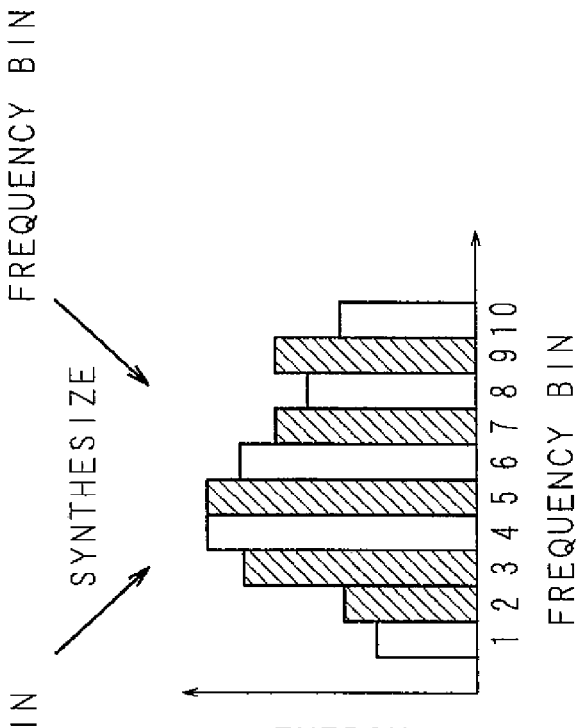

The spectra on which the deleting process is performed in the deletion units 141, 141 for respective data series are output to the synthesizing unit 16, respectively. The synthesizing unit 16 performs the process of synthesizing the spectra of the frequency bands output from the deletion units, 141, 141. In this example, the spectrum in a use frequency bin for the data series 1 and the spectrum in a use frequency bin for the data series 2 are synthesized. As illustrated in FIG. 5C, the spectra for the use frequency bins are synthesized without conflict of the frequency bins between the data series 1 and 2.

The synthesized spectrum is output to the IDFT unit 17. The IDFT unit 17 performs frequency to time conversion on the synthesized spectrum, and outputs a digital signal for the spectrum after time conversion to the CP addition unit 18. Though the present embodiment has described an example wherein the spectra for the respective data series are synthesized before frequency to time conversion by the IDFT unit 17, it is also possible that frequency to time conversion may first be performed on the spectra for the respective data series by the IDFT unit 17 and then the digital signals for the respective data series may be synthesized. The CP addition unit 18 copies a part of the digital signals so as to prevent interference between symbols. The CP addition unit 18 then attaches the copied digital signal to a guard interval part (head of the digital signal), extending the length of the digital signal. The digital signal extended at the CP addition unit 18 is output to the multiplex unit 19. The pilot signal generation unit 191 outputs a pilot signal such as a distributed pilot signal, a continual pilot signal or the like to the multiplex unit 19. The pilot signal is appropriately inserted at the multiplex unit 19 to be used for estimation of a propagation channel characteristic at a channel characteristic estimation unit 261 in the reception device 2. The digital signal for which the pilot signal is multiplexed at the multiplex unit 19 is output to the quadrature modulation unit 101.

The quadrature modulation unit 101 performs quadrature modulation on the output digital signal to convert it into an intermediate frequency band. The quadrature-modulated digital signal is output to the frequency conversion unit 102. The frequency conversion unit 102 converts the frequency band of the quadrature-modulated digital signal from the intermediate frequency band to the radio frequency band, and supplies it to the antenna 103 which is a transmission/reception unit. Thus, the digital signal for the synthesized spectrum is sent to the reception device 2.

Next, the configuration of the reception device 2 is described with reference to FIG. 3. The reception device 2 is configured including an antenna 21, a quadrature demodulation unit 22, a RF band separation unit 23, a CP removal unit 24, a DFT unit 25, a switch 27, a communication quality transmission unit 26, a selection unit 28, a use frequency band notification unit 281, a separation unit 29, an equalization unit (hereinafter referred to as a turbo equalization unit) 3 and the like. The digital signal received at the antenna 21, which is a transmission/reception unit, is demodulated from the IF band to the baseband digital signal at the quadrature demodulation unit 22. The demodulated digital signal is output to the RF band separation unit 23. The RF band separation unit 23 separates a pilot signal from the digital signals. The pilot signal of the separated digital signals is output to the channel characteristic estimation unit 261, while the other data signals are output to the CP removal unit 24. The channel characteristic estimation unit 261 estimates the characteristic of each data signal based on the pilot signal.

Moreover, the channel communication quality generation unit 262 generates information on the communication quality in a band to output it to the communication quality transmission unit 26. The communication quality transmission unit 26 sends the information on the communication quality to the transmission device 1 at an appropriate timing. The sent information on the communication quality is stored in the communication quality storing unit 131 in the transmission device 1 illustrated in FIG. 2. A data signal in digital signals, from which a guard interval part is removed at the CP removal unit 24, is output to the DFT unit 25 which acts as a conversion unit on the reception side. The DFT unit 25 performs time to frequency conversion, so that a spectrum after frequency conversion is output to the separation unit 29 or the selection unit 28 via the switch 27.

The separation unit 29 separates the synthesized spectrum for each data series in accordance with a use frequency band, whereas the selection unit 28 selects a use frequency band based on the energy distribution of a propagation channel frequency characteristic through which each data series passes. Since the use frequency band needs to be pre-selected, the switch 27 is switched to the selection unit 28 side when the selecting process is performed. To the selection unit 28, a spectrum of a frequency band for each data series before synthesizing is input. The selection unit 28 selects a use frequency band for each data series based on the energy distribution of the propagation channel frequency characteristic, through which a plurality of data series sent from the transmission device 1 pass, avoiding overlap of a use frequency band to be selected between each data series.

In the example described above, when there are data series 1 and data series 2, the selection unit 28 first selects a frequency bin with the highest energy for the data series 1, and then selects a frequency bin with the highest energy for the data series 2. Next, the selection unit 28 selects a frequency bin with the second highest energy for the data series 1, and then selects a frequency bin with the second highest energy for the data series 2. It is noted that a process of deciding a frequency bin to be deleted by selecting frequency bins in the order of increasing energy may also be employed. Accordingly, as illustrated in FIGS. 5A and 5B, the frequency bins 2, 3, 5, 7 and 9 that correspond to a use frequency band are selected for the data series 1 in the order of decreasing energy, whereas the frequency bins 1, 4, 6, 8 and 10 that correspond to a use frequency band are selected for the data series 2 in the order of decreasing energy.

Such processes are repeated to decide a use frequency band, or in other words, a frequency band to be deleted. Though the example was described above wherein use frequency bands for each data series are alternately selected in the order that a band with higher energy comes first, the percentage of selection may be changed in accordance with the level of importance for data series. For example, when there are three data series, 50% of the use frequency band may be assigned to the data series 1 with the highest level of importance, while 25% of the use frequency band may be assigned to the data series 2 and 25% of the use frequency band may be assigned to the data series 3, for example.

The use frequency band for each data series selected by the selection unit 28 is output to the use frequency band notification unit 281. The use frequency band notification unit 281 notifies the transmission device 1 of the use frequency band for each data series at an appropriate timing. In the example described above, information on the use frequency bins 2, 3, 5, 7 and 9 are sent as the frequency band to be used for the data series 1, whereas the use frequency bins 1, 4, 6, 8 and 10 are sent as the frequency band to be used for the data series 2. The transmission device 1 receives the use frequency band for each data series and stores the use frequency band, by associating it with each data series, in the use frequency band storing unit 15. In the example described above, the transmission device 1 receives information on the use frequency bins 2, 3, 5, 7 and 9 as the frequency band to be used for the data series 1, whereas it receives information on the use frequency bins 1, 4, 6, 8 and 10 as the frequency band to be used for the data series 2. The transmission device 1 receives the use frequency band for each data series. It is noted that the side of the transmission device 1 may be provided with the selection unit 28 to select the use frequency band for each data series based on the energy in the frequency bins, which is output from the shaping units 13, 13. In this case, the use frequency band for each data series selected at the selection unit 28 in the transmission device 1 is stored in the use frequency band storing unit 15. The reception unit 2 is then notified of the use frequency band for each data series selected at the selection unit 28 and uses it.

If the selecting process by the selection unit 28 is terminated, a switch control unit (not illustrated) switches the switch 27 from the selection unit 28 side to the separation unit 29 side. The synthesized spectrum illustrated in FIG. 5C is input to the separation unit 29. The separation unit 29 performs separation of the synthesized spectrum with reference to the use frequency band for each data series selected at the selection unit 28. The synthesized spectrum illustrated in FIG. 5C is separated again as in FIGS. 5A and 5B, so that the spectrum for the data series 1 is stored in the frequency bins 2, 3, 5, 7 and 9, whereas the spectrum for the data series 2 is stored in the frequency bins 1, 4, 6, 8 and 10.

The spectrum for each data series separated at the separation unit 29 is output to the turbo equalization units 3, 3 illustrated in FIG. 3. As illustrated in FIG. 5A or FIG. 5B, the turbo equalization unit 3 performs non-linear iterative equalization in which an equalization process is effectively performed while reducing interference even if the energy of a given frequency band is 0. Though, in the present embodiment; the turbo equalization unit 3 is used for a non-linear iterative equalization unit, while a Soft Canceller/Minimum Mean Square Error (SC/MME) turbo equalizer performing minimum squared error-based turbo equalization with an ability of interference suppression by a soft canceller is used, it is not limited thereto. For example, a different type of equalizer that obtains a posteriori probability may also be employed. Moreover, Sum-Product equalization which utilizes a message passing algorithm may be used as non-linear iterative equalization. It is noted that Tadashi Matsumoto and Shinsuke Ibi's "Turbo Equalization: Fundamentals and Information Theoretic Considerations" *Institute of Electronics, Information and Communication Engineers transactions B* Vol. J90-B No. 1 pp 1-16 describes the SC/MMSE turbo equalizer in detail.

The turbo equalization unit 3 is configured including a channel equalizer 31, a soft estimation value estimator 32 and an error correction decoder 33. The channel equalizer 31 is a linear channel equalizer based on the minimum squared error, performing an equalization process by putting a reverse characteristic on the spectrum of a frequency band. It is noted that the channel equalizer 31 does not perform linear equalization for a band with zero energy, since a new interference occurs if it performs linear channel equalization based on the minimum squared error. The spectrum which passed through the channel equalizer 31 is input to the soft estimation value estimator 32 to be demodulated, and is input to the error correction decoder 33 having an error correction function. The soft estimation value estimator 32 performs the role of converting an output of the channel equalizer 31 into input information suitable for the error correction decoder 33. The error correction decoder 33 presents not only a regular error correction effect, but also an effect for compensating a damage of information amount caused by the energy being zero. The spectrum of a frequency band on which the error correction and decoding processes are performed at the error correction decoder 33 is input again to the channel equalizer 31.

By repeatedly executing non-linear turbo equalization performed by the channel equalizer 31, the soft estimation value estimator 32 and the error correction decoder 33, the spectrum input to the turbo equalization unit 3 is equalized. The turbo equalization unit 3 outputs the equalized spectrum of a frequency band as a spectrum for the data series 1. Likewise, the turbo equalization unit 3 on the side of the data series 2 outputs the equalized spectrum for the data series 2. It is noted that the number of repetitions may be pre-set, or may be set in the manner that the spectrum for data series is output to the outside when the equalization reached a predetermined level.

The selecting process and a series of processes in the hardware configuration above will be described using flowcharts.

Figure 7:
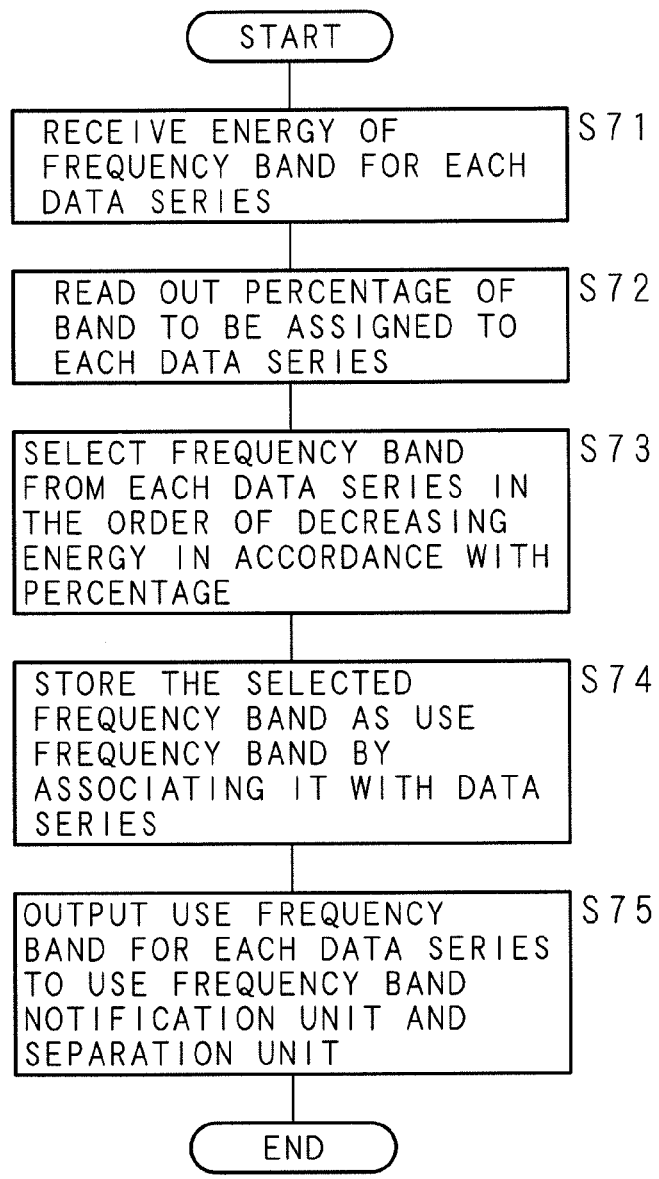
FIG. 7 is a flowchart illustrating the procedure of a selecting process.

FIG. 7 is a flowchart illustrating the procedure of the selecting process. The selection unit 28 performs the processes described below by a processor (not illustrated) in accordance with a program stored in an inside memory (not illustrated). The selection unit 28 receives energy of the frequency band for each data series output from the DFT unit 25 via the switch 27 (step S71). The selection unit 28 reads out, from the memory, the percentage of band to be assigned to each data series (step S72). For example, information such as 50% for the data series 1 and 50% for the data series 2 or the like may be stored in the memory.

The selection unit 28 selects a frequency band from each data series in the order of decreasing energy in accordance with the read-out percentage, so as to avoid overlapping of a frequency band to be selected between the data series (step S73). The selection unit 28 stores the selected frequency band in the memory, by associating it with the corresponding data series, as a use frequency band (step S74). Finally, the selection unit 28 outputs the use frequency band for each data series to the use frequency band notification unit 281 and the separation unit 29 (step S75).

Figure 8:
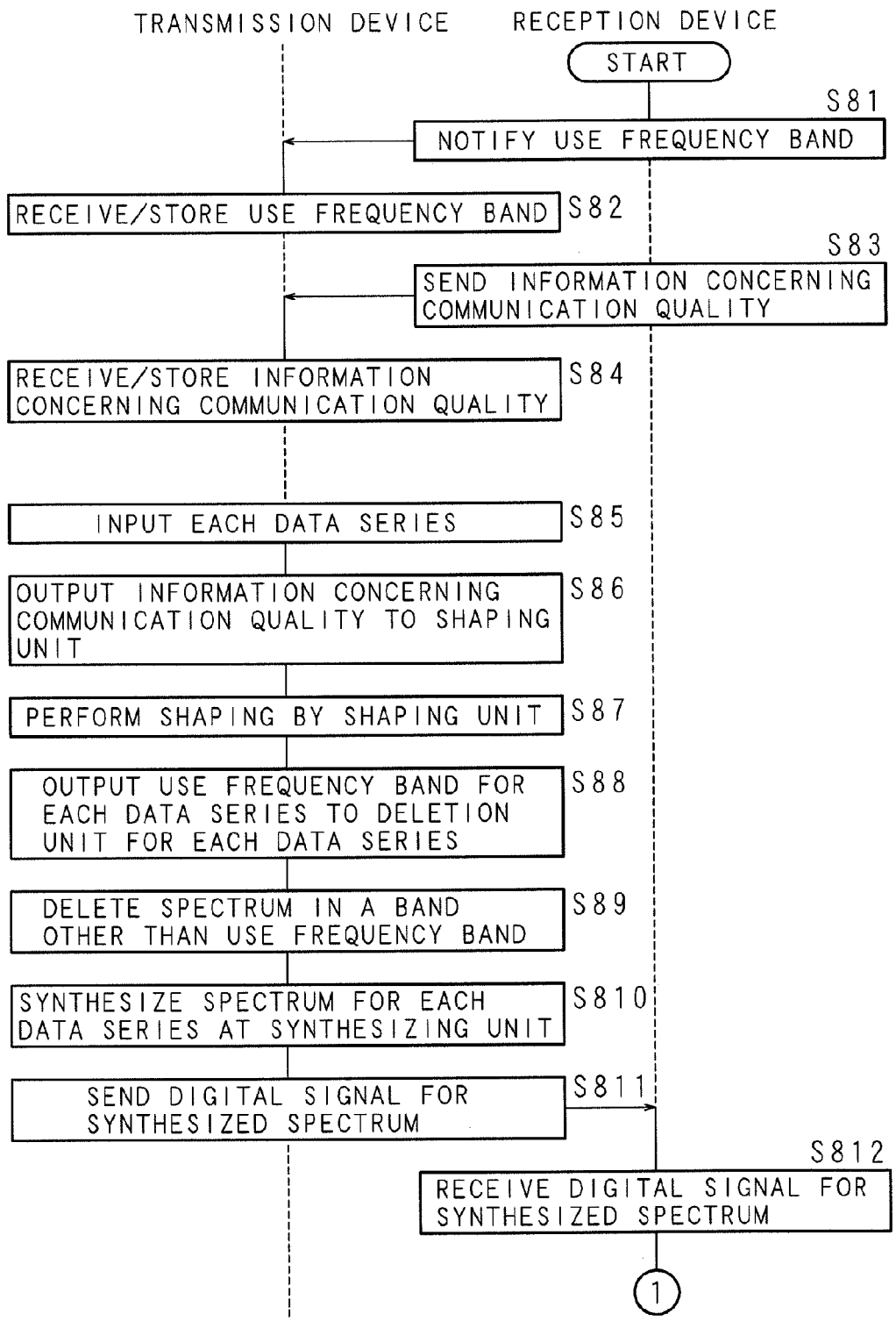
FIG. 8 is a flowchart illustrating the procedure of synthesizing and separating processes.
Figure 9:
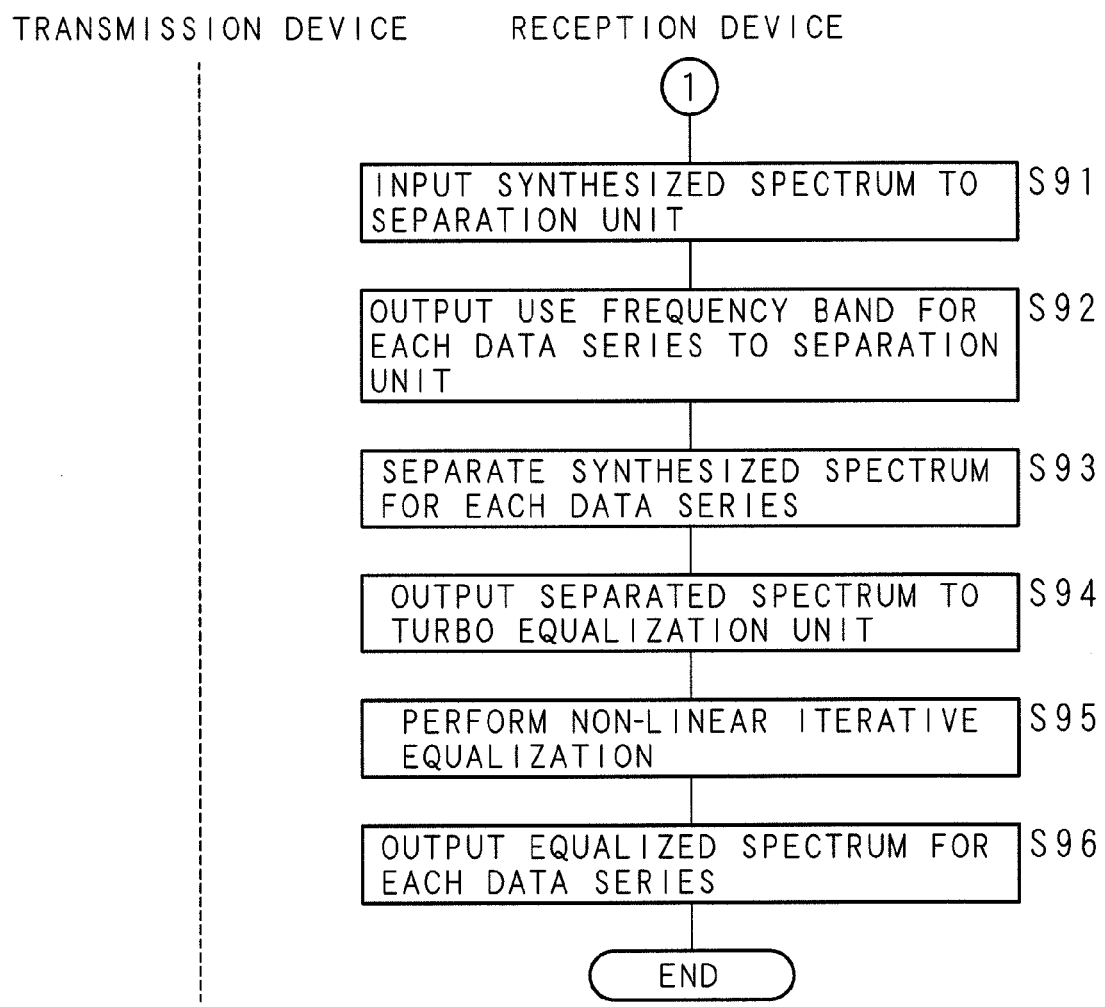
FIG. 9 is a flowchart illustrating the procedure of synthesizing and separating processes.

FIGS. 8 and 9 show a flowchart illustrating the procedure of synthesizing and separating processes. The reception device 2 notifies the transmission device 1 of the use frequency band for each data series selected by the above-described process (step S81). The transmission device 1 receives the notified use frequency band for each data series and stores it in the use frequency band storing unit 15 (step S82). Moreover, the reception unit 2 sends the information concerning communication quality generated at the channel communication quality generation unit 262 to the transmission device 1 via the communication quality transmission unit 26 (step S83). The transmission device 1 receives the sent information concerning communication quality and stores it in the communication quality storing unit 131 (step S84).

Subsequently, each data series is input to the baseband signal generator 11 (step S85). The communication quality storing unit 131 outputs the information concerning communication quality to the shaping unit 13 (step S86). The shaping unit 13 performs shaping of the input spectrum using the water filling principal (step S87), the spectrum after shaping being input to the deletion unit 141. The use frequency band storing unit 15 outputs the use frequency band for each data series to the deletion unit 141 for each data series (step S88). The deletion unit 141 deletes the spectrum in a band other than the input use frequency band (step S89). The spectrum obtained after deletion is output to the synthesizing unit 16.

The synthesizing unit 16 synthesizes the spectrum for each data series (step S810). A digital signal for the synthesized spectrum is sent to the reception device 2 (step S811). The reception device 2 receives the sent digital signal for the synthesized spectrum (step S812). The synthesized spectrum is input to the separation unit 29 via the switch 27 (step S91). The selection unit 28 outputs the use frequency band for each data series to the separation unit 29 (step S92). The separation unit 29 separates the synthesized spectrum for each data series with reference to the output use frequency band for each data series (step S93).

The separation unit 29 outputs the separated spectrum to the turbo equalization unit 3 for each data series (step S94). The turbo equalization unit 3 executes the above-described non-linear iterative equalization process (step S95). The equalized spectrum for each data series is output to the outside from the turbo equalization unit 3 (step S96).

Embodiment 2

Figure 10:
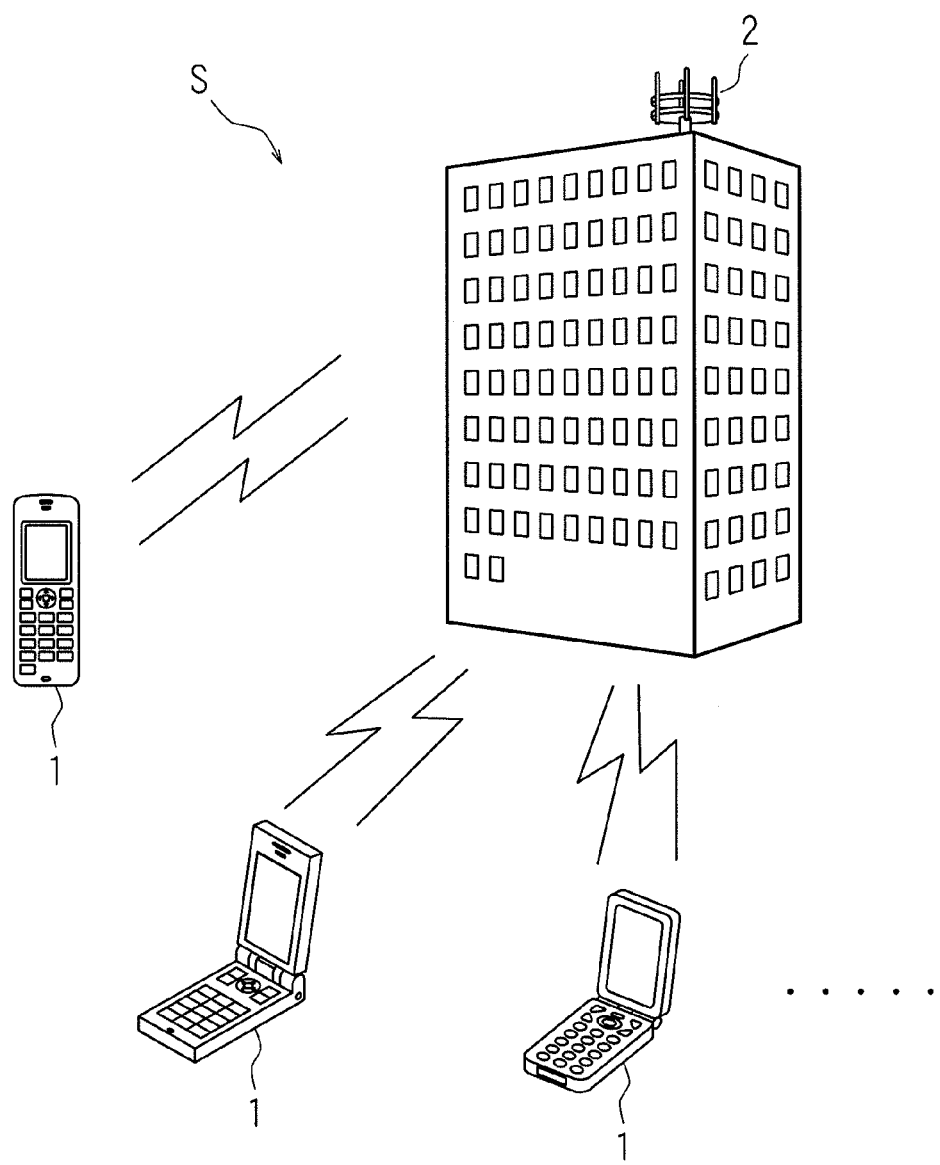
FIG. 10 is an explanatory drawing illustrating an overview of a transmission system according to Embodiment 2.

Embodiment 2 relates to a form wherein synthesized spectra sent from a plurality of transmission devices 1, 1, . . . are separated at the reception device 2. FIG. 10 is an explanatory drawing illustrating an overview of a transmission system S according to Embodiment 2. The transmission system S according to Embodiment 2 is configured including transmission devices 1, 1, 1, . . . , which are a plurality of user's mobiles phones, and the reception device 2, which is a base station. In Embodiment 2, the spectra in bands other than use frequency bands are deleted in a plurality of transmission devices 1, 1, 1, . . . , while the reception device 2 separates the spectrum of each transmission device 1 to be synthesized and performs turbo equalization on the spectrum for each transmission device 1. An example is described below wherein two transmission devices 1A, 1B are used to facilitate explanation.

Figure 11:
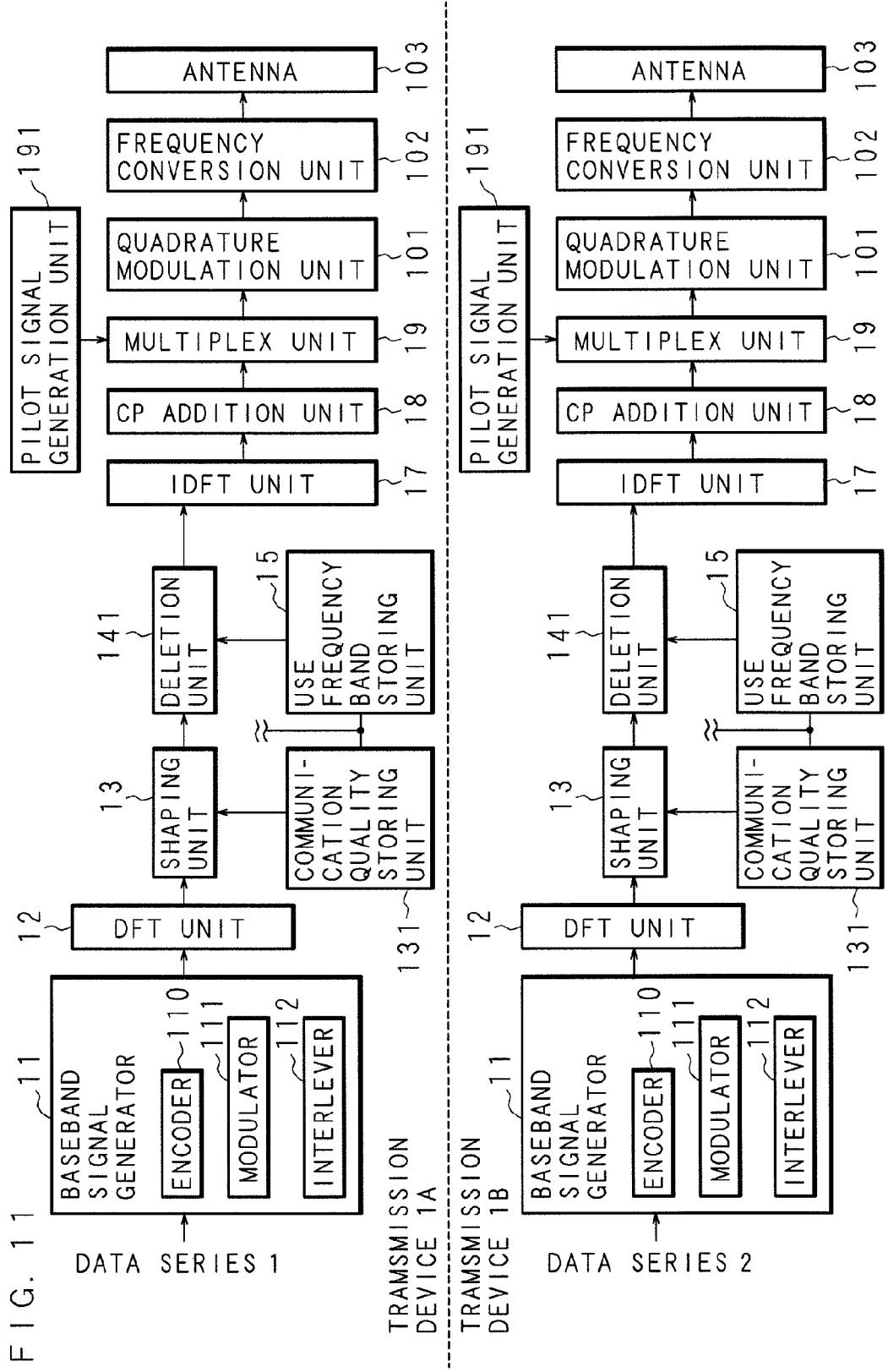
FIG. 11 is a block diagram illustrating the hardware configuration of transmission devices according to Embodiment 2.
Figure 12:
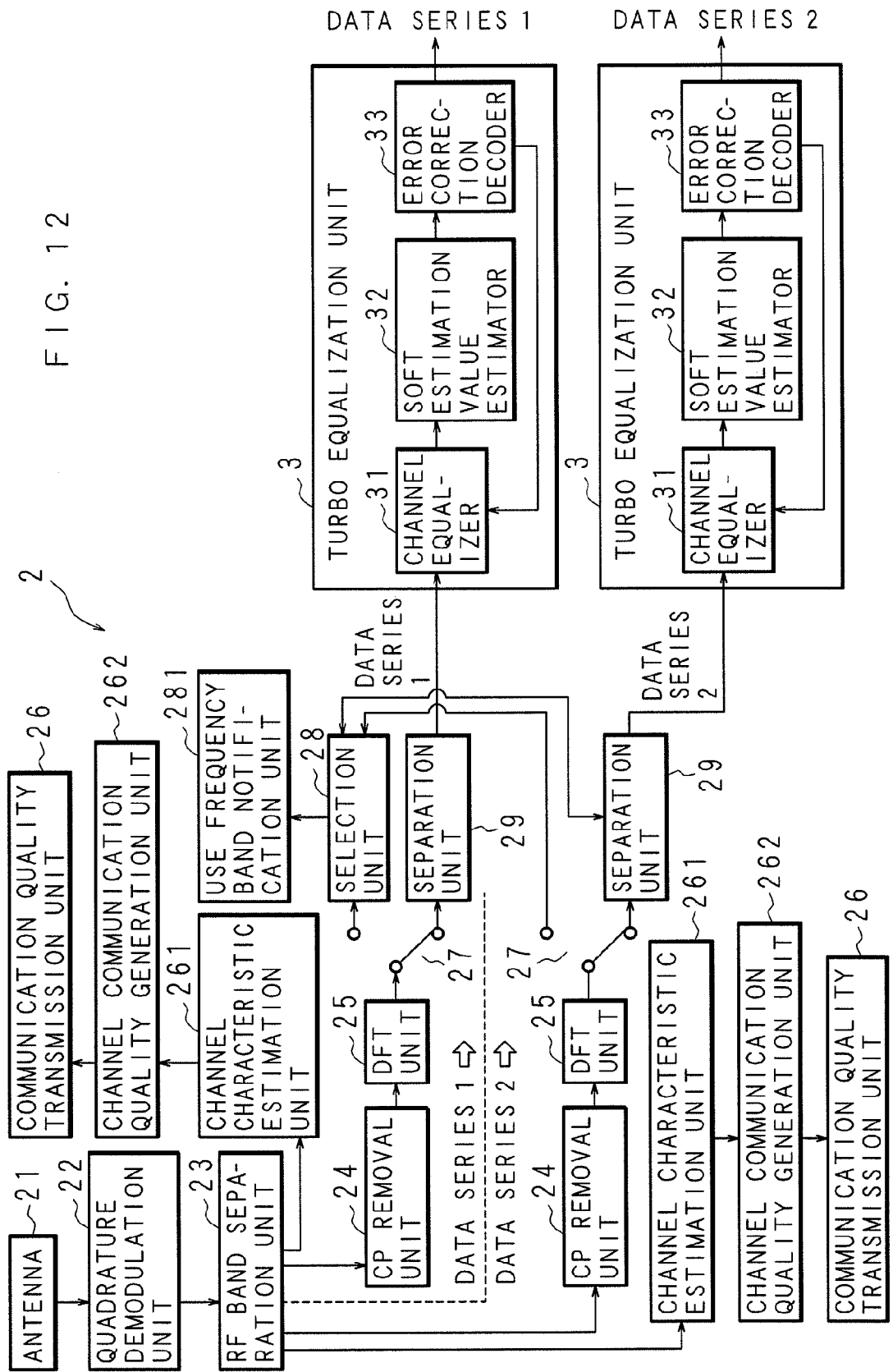
FIG. 12 is a block diagram illustrating the hardware configuration of a reception device according to Embodiment 2.

FIG. 11 is a block diagram illustrating the hardware configuration of transmission devices 1A, 1B according to Embodiment 2, whereas FIG. 12 is a block diagram illustrating the hardware configuration of the reception device 2 according to Embodiment 2. For the transmission devices 1A, 1B illustrated in FIG. 11, the transmission device 1A transmitting the data series 1 is shown in the upper column, whereas the transmission device 1B transmitting the data series 2 is shown in the lower column. Unlike Embodiment 1, digital signals for the spectrum sent from each of transmission devices 1A, 1B are synthesized on the reception device 2 side, so that the synthesizing unit 16 does not exist as described in Embodiment 1. Other parts are substantially the same as the configuration described in Embodiment 1.

In the transmission device 1A, energy shaping for the data series 1 is performed by the shaping unit 13, the shaped spectrum being output to the deletion unit 141. The deletion unit 141 deletes the energy of a band other than corresponding use frequency bands in accordance with the use frequency bands for the transmission devices 1A, 1B selected at the selection unit 28 in the reception device 2, and sends the spectrum after deletion to the reception device 2 from each of the transmission devices 1A, 1B.

In the reception device 2 illustrated in FIG. 12, the upper column is a system for processing the data series 1 from the transmission device 1A, whereas the lower column is a system for processing the data series 2 from the transmission device 1B. Information concerning the communication quality between the transmission device 1A and the reception device 2, and that between the transmission device 1B and the reception device 2 are generated at the channel communication quality generation units 262, 262, respectively. The information concerning the communication quality between the transmission device 1A and the reception device 2 is sent from the communication quality transmission unit 26 on the data series 1 side to the transmission device 1A. The shaping unit 13 for the transmission device 1 performs a shaping process in accordance with the received information concerning communication quality output from the communication quality storing unit 131.

Likewise, the information concerning communication quality between the transmission device 1B and the reception device 2 is sent from the communication quality transmission unit 26 on the data series 2 side to the transmission device 1B. The shaping unit 13 for the transmission device 1B performs a shaping process in accordance with the received information concerning communication quality output from the communication quality storing unit 131. The selection unit 28 in the reception device 2 selects use frequency bands to be used for the transmission device 1A and the transmission device 1B, respectively, in accordance with the spectra sent from the transmission device 1A and the transmission device 1B.

When the selection process is performed, the switches 27, 27 are switched to the side of the selection unit 28, the spectra for the transmission devices 1A, 1B from the DFT units 25, 25 being output to the selection unit 28. The selection unit 28 selects a use frequency band for the transmission device 1A and a use frequency band for the transmission device 1B, respectively, by an algorithm similar to that of Embodiment 1, such that the use frequency band for the transmission device 1A does not have a conflict with the use frequency band for the transmission device 1B. The selection unit 28 outputs the selected use frequency band for each of the transmission devices 1A, 1B to the use frequency band notification unit 281 and the separation unit 29. The use frequency band notification unit 281 notifies the transmission device 1A of the use frequency band for the transmission device 1A, and notifies the transmission device 1B of the use frequency band for the transmission device 1B.

The transmission device 1A stores the notified use frequency band in the use frequency band storing unit 15. The deletion unit 141 in the transmission device 1A sets the energy in a band other than the use frequency band output from the use frequency band storing unit 15 to zero in accordance therewith. Likewise, the transmission device 1B also stores the notified use frequency band in the use frequency band storing unit 15. The deletion unit 141 in the transmission device 1B sets the energy in a band other than the use frequency band output from the use frequency band storing unit 15 to zero in accordance therewith. Accordingly, spectra of given frequency bands with zero energy are sent to the reception device 2 and synthesized.

When the synthesized spectrum is separated by the separation unit 29, the switches 27, 27 are switched to the side of separation units, 29, 29. The separation unit 29 on the data series 1 side then separates the spectrum for the data series 1 based on the use frequency band for the transmission device 1A output from the selection unit 28, and outputs the separated spectrum to the turbo equalization unit 3. Likewise, the separation unit 29 on the data series 2 side separates the spectrum for the data series 2 based on the use frequency band for the transmission device 1B output from the selection unit 28, and outputs the separated spectrum to the turbo equalization unit 3.

Figure 13:
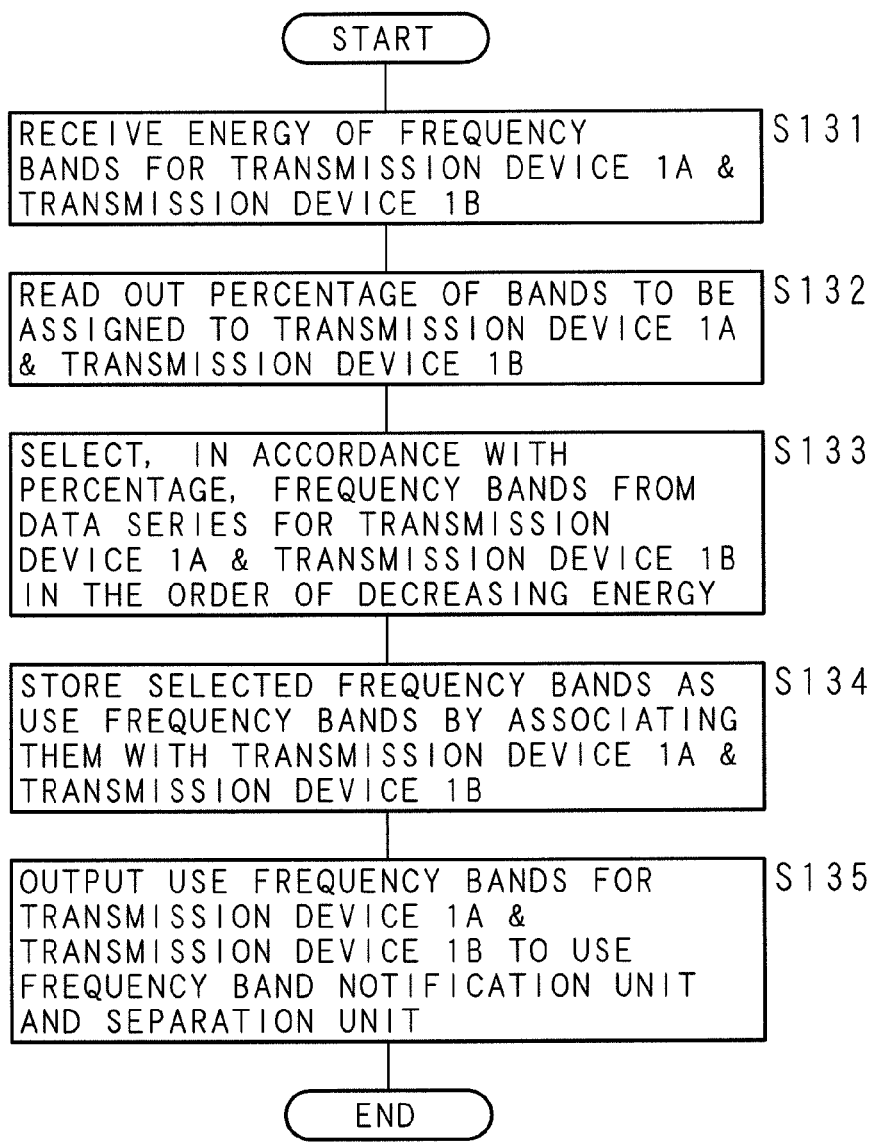
FIG. 13 is a flowchart illustrating the procedure of a selecting process according to Embodiment 2.

FIG. 13 is a flowchart illustrating the procedure of the selecting process according to Embodiment 2. The selection unit 28 receives the energy of frequency bands for the data series in the transmission device 1A and the transmission device 1B that are output from the DFT units 25, 25 via the switches 27, 27 (step S131). The selection unit 28 reads out the percentage of bands to be assigned to the transmission device 1A and the transmission device 1B from the memory (step S132). Note that the percentage may be such that 80% is assigned to the transmission device 1A, whereas 20% is assigned to the transmission device 1B, for example, in accordance with the importance level.

The selection unit 28 selects, in accordance with the read-out percentage, frequency bands for the data series in the transmission device 1A and the transmission 1B in the order of decreasing energy, so as to avoid overlapping of the frequency bands to be selected between the data series for the transmission device 1A and the transmission device 1B (step S133). The selected frequency bands are stored in the memory as use frequency bands, by associating them with the transmission device 1A and the transmission device 1B, respectively (step S134). Finally, the selection unit 28 outputs the use frequency bands for the transmission device 1A and the transmission device 1B to the use frequency band notification unit 281 and the separation unit 29 (step S135).

Figure 14:
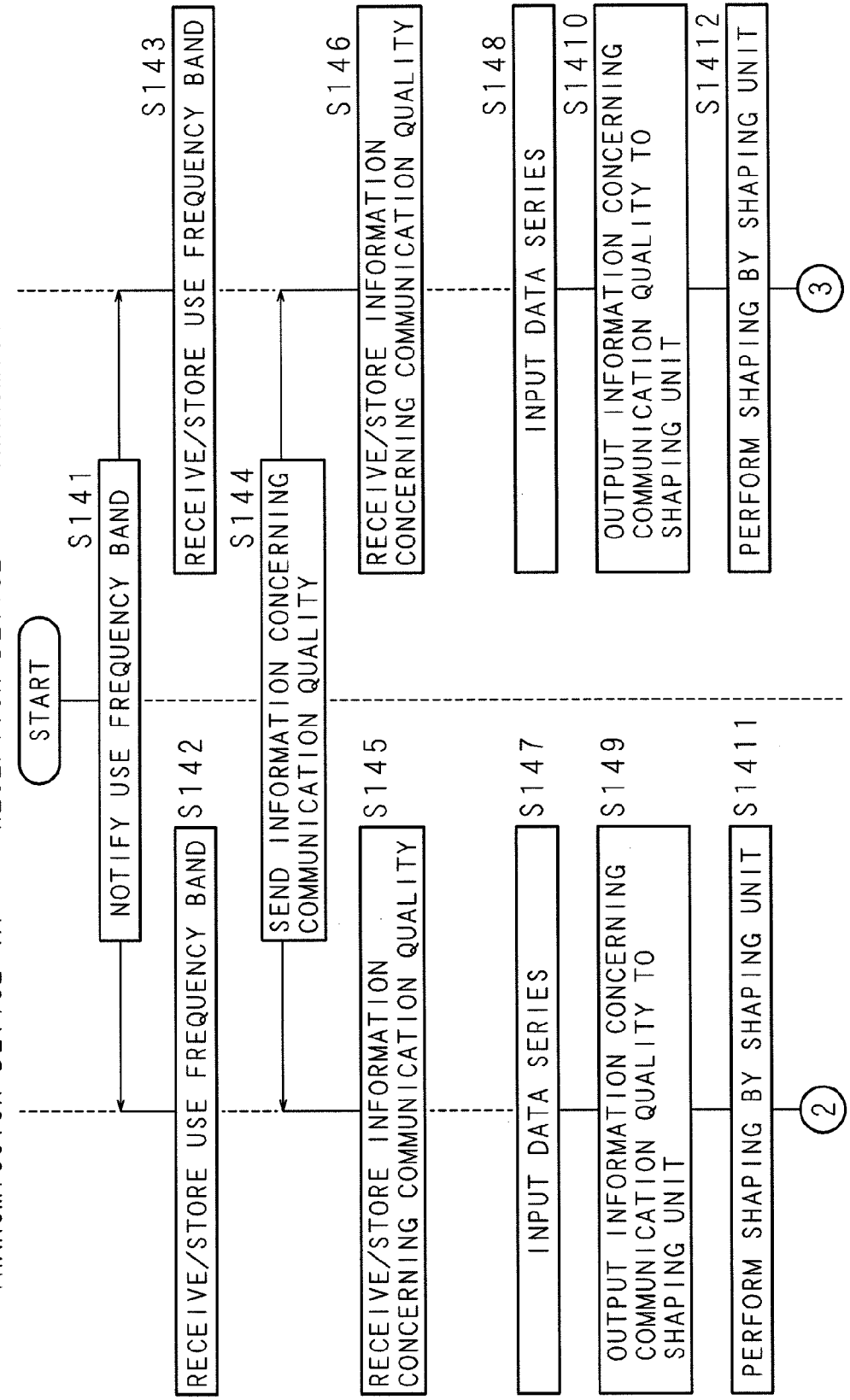
FIG. 14 is a flowchart illustrating the procedure of synthesizing and separating processes.
Figure 15:
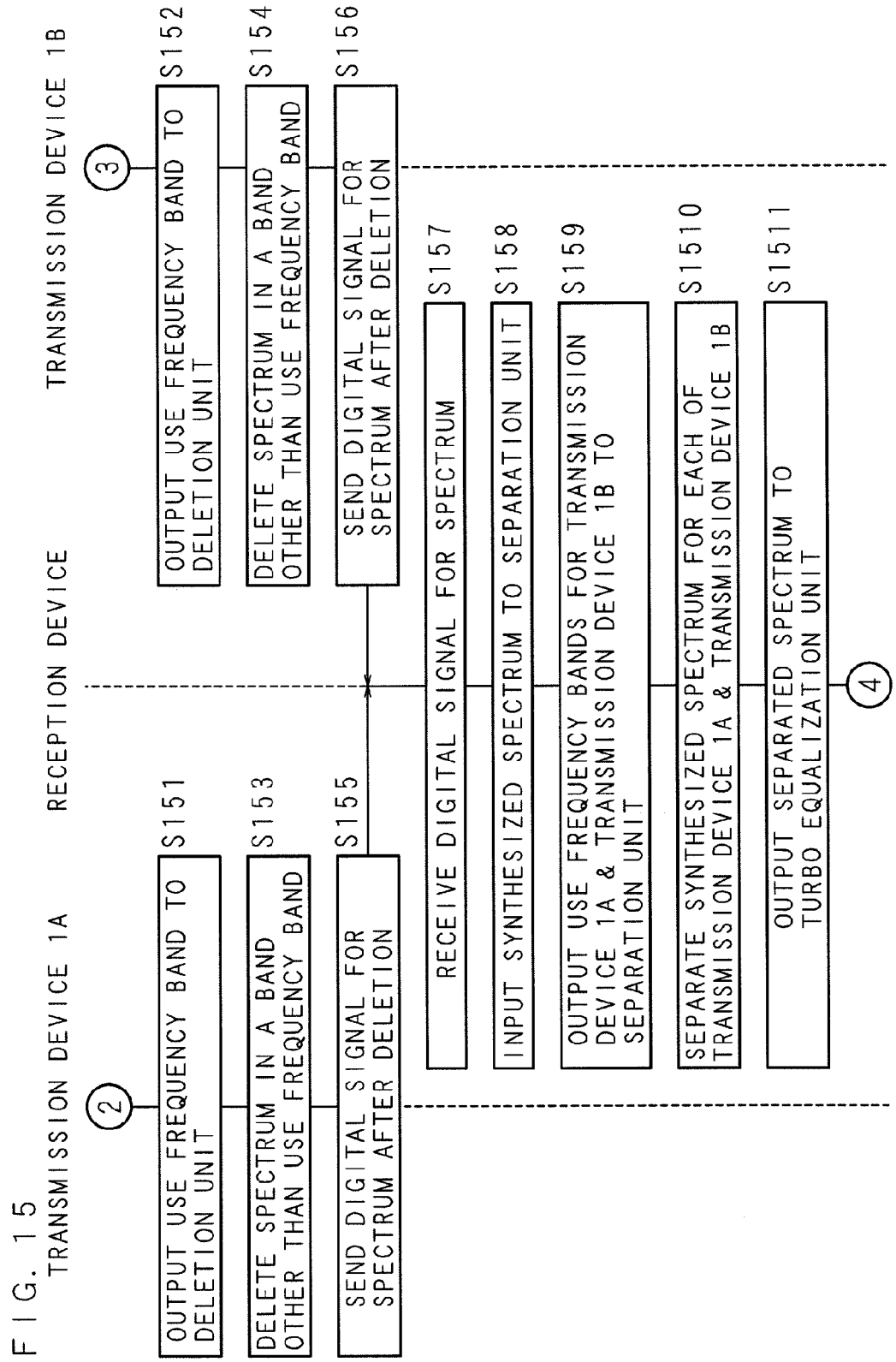
FIG. 15 is a flowchart illustrating the procedure of synthesizing and separating processes.
Figure 16:
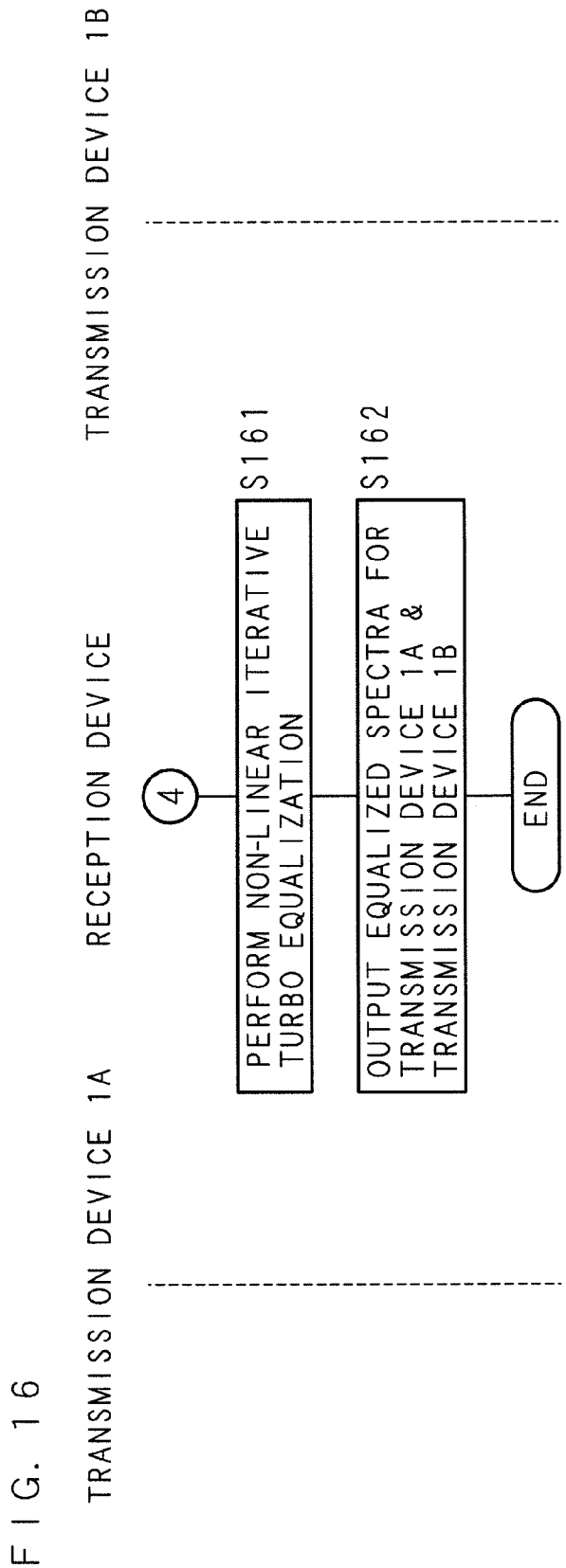
FIG. 16 is a flowchart illustrating the procedure of synthesizing and separating processes.

FIG. 14 to FIG. 16 show a flowchart illustrating the synthesizing and separating processes. The reception device 2 notifies the transmission device 1A and the transmission device 1B, respectively, of the use frequency bands for the transmission device 1A and the transmission device 1B that are selected by the processes described above (step S141). The transmission device 1A receives the sent use frequency band for the transmission device 1A and stores it in the use frequency band storing unit 15 (step S142). Likewise, the transmission device 1B receives the sent use frequency band for the transmission device 1B and stores it in the use frequency band storing unit 15 (step S143). Moreover, the reception device 2 sends the information concerning communication quality generated at the channel communication quality generation units 262, 262 to the transmission device 1A and the transmission device 1B, respectively, via the communication quality transmission units 26, 26 (step S144). The transmission device 1A receives the sent information concerning communication quality between the transmission device 1A and the reception device 2 and stores it in the communication quality storing unit 131 (step S145). Likewise, the transmission device 1B receives the sent information concerning communication quality between the transmission device 1B and the reception device 2 and stores it in the communication quality storing unit 131 (step S146).

Thereafter, the data series 1 is input to the baseband signal generator 11 in the transmission device 1A (step S147), whereas the data series 2 is similarly input to the baseband signal generator 11 in the transmission device 1B (step S148). The communication quality storing unit 131 in the transmission device 1A outputs the information concerning communication quality to the shaping unit 13 (step S149), whereas the communication quality storing unit 131 in the transmission device 1B similarly outputs the information concerning communication quality to the shaping unit 13 (step S1410). The shaping unit 13 in the transmission device 1A performs shaping of the input spectrum using the water filling principal, in accordance with the output from the communication quality storing unit 131 (step S1411). Likewise, the shaping unit 13 in the transmission device 1B performs shaping of the input spectrum using the water filling principal, in accordance with the output from the communication quality storing unit 131 (step S1412).

The spectrum after shaping is input to the deletion unit 141 in the transmission device 1A, whereas the spectrum after shaping for the transmission device 1B is similarly input to the deletion unit 141 in the transmission device 1B. The use frequency band storing unit 15 in the transmission device 1A outputs the use frequency band for the data series 1 to the deletion unit 141 (step 151). Likewise, the use frequency band storing unit 15 in the transmission device 1B outputs the use frequency band for the data series 2 to the deletion unit 141 (step 152). The deletion unit 141 in the transmission device 1A deletes the spectrum in a band other than the input use frequency band (step S153), whereas the deletion unit 141 in the transmission device 1B similarly deletes the spectrum in a band other than the input use frequency band (step S154). In this case, there is no conflict of the frequency bins to be deleted between the transmission device 1A and the transmission device 1B.

The transmission device 1A sends a digital signal for the spectrum after deletion to the reception device 2 (step S155), while the transmission device 1B sends a digital signal for the spectrum after deletion to the reception device 2 (step S156). The reception device 2 receives the digital signals for spectra sent from both the transmission device 1A and the transmission device 1B (step S157). The synthesized spectrum is input to the separation units 29, 29 via the switch 27 (step S158). The selection unit 28 outputs the use frequency band for the transmission device 1A to the separation unit 29 on the data series 1 side, while the selection unit 28 outputs the use frequency band for the transmission device 1B to the separation unit 29 on the data series 2 side (step S159). The separation unit 29 on the data series 1 side separates the synthesized spectrum for the transmission device 1A with reference to the use frequency band for the transmission device 1A, whereas the separation unit 29 on the data series 2 side separates the synthesized spectrum for the transmission device 1B with reference to the use frequency band for the transmission device 1B (step S1510).

The separation unit 29 on the data series 1 side outputs the spectrum for the transmission device 1A to the turbo equalization unit 3 on the data series 1 side, whereas the separation unit 29 on the data series 2 side outputs the spectrum for the transmission device 1B to the turbo equalization unit 3 on the data series 2 side (step S1511). The turbo equalization unit 3 executes the process of non-linear iterative equalization described above (step S161). Specifically, the channel equalizer 31 performs an equalization process by putting a reverse characteristic on the spectrum in a band other than the band with zero energy. The spectrum obtained after the equalization process is output to the soft estimation value estimator 32. The spectrum is demodulated at the soft estimation value estimator 32 and input to the error correction decoder 33 having an error correction function. The error correction decoder 33 has not only a regular error correction effect, but also an effect for compensating a damage of information amount caused by the energy being zero. The spectrum of a frequency band to which the error correction and decoding processes are performed at the error correction decoder 33 is input again to the channel equalizer 31 where an equalization process is performed. The processes above are repeatedly executed. The equalized spectrum for the transmission device 1A is output to the outside from the turbo equalization unit 3 on the data series 1 side, while the equalized spectrum for the transmission device 1B is output to the outside from the turbo equalization unit 3 on the data series 2 side (step S162).

Embodiment 2 is configured as described above while the other configurations and functions are similar to those in Embodiment 1, so that the corresponding parts are provided with the same reference numbers and will not be described in detail.

Embodiment 3

Figure 17:
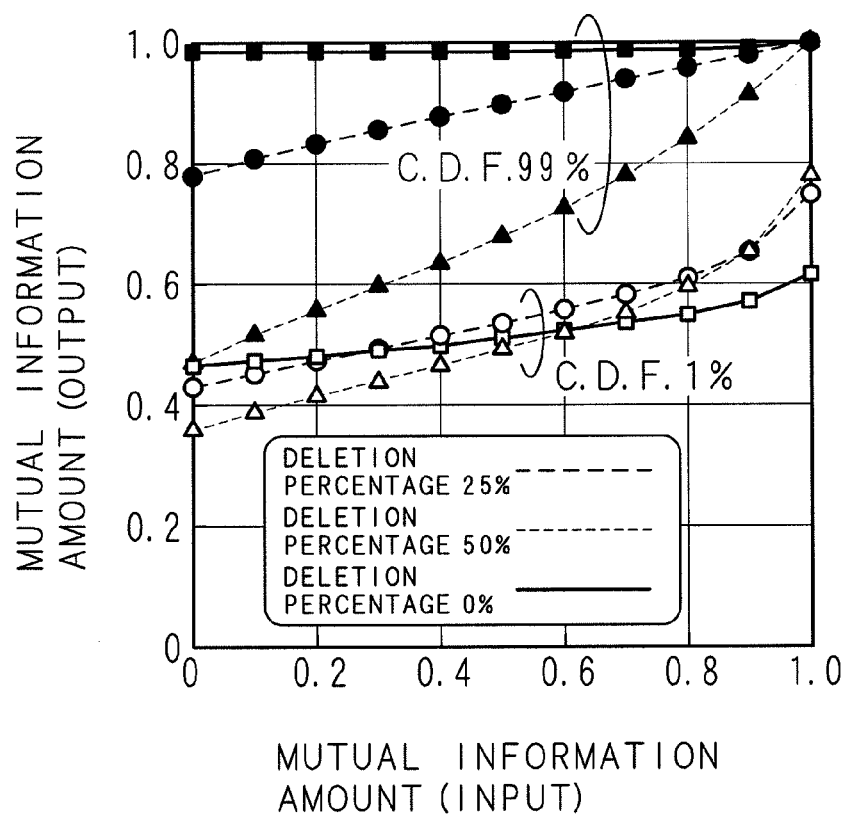
FIG. 17 is a graphic chart illustrating EXIT characteristics of a turbo equalization unit.

FIG. 17 is a graphic chart illustrating EXIT characteristics of the turbo equalization unit 3. In FIG. 17, the horizontal axis indicates the amount of input mutual information that is fed back from the error correction decoder 33, which is a Soft Input Soft Output (SifSfo) decoder, and input to the channel equalizer 31, whereas the vertical axis indicates the amount of output mutual information that is output from the channel equalizer 31 and input to the error correction decoder 33. Note that the Exit characteristics are calculated in the manner that the communication channel is the SISO communication channel, while a propagation channel model is the 2dZB, exponential attenuation 24-path Rayleigh model, with a signal-to-noise power ratio of $E_S/N_O=7$ dB.

C.D.F. in FIG. 17 indicates cumulative probability distribution, the groups with 99% of C.D.F and with 1% of C.D.F. being illustrated, respectively. The series indicated by the solid line and black squares is a characteristic with the C.D.F. of 99% and the deletion percentage of 0%, whereas the series indicated by the solid line and white squares is a characteristic with the C.D.F. of 1% and the deletion percentage of 0%. The series indicated by the dotted line and black circles is a characteristic with the C.D.F. of 99% and the deletion percentage of 25%, whereas the series indicated by the dotted line and white circles is a characteristic with the C.D.F. of 1% and the deletion percentage of 25%. Furthermore, the series indicated by the dotted line and black triangles is a characteristic with the C.D.F. of 99% and the deletion percentage of 50%, whereas the series indicated by the dotted line and white triangles is a characteristic with the C.D.F. of 1% and the deletion percentage of 50%. The deletion percentage here indicates the percentage of a frequency band to be deleted (delete frequency bins) at the deletion unit 141, or conversely, the percentage of a use frequency band to be used (use frequency bins) for each data series or each transmission device 1, selected by the selection unit 28. For example, if the deletion percentage is 0%, the percentage of delete frequency bins to all frequency bins is 0%, and if the deletion percentage is 50%, the percentage of delete frequency bins to all frequency bins is 50%, while if the deletion percentage is 25%, the percentage of delete frequency bins to all frequency bins is 25%.

As illustrated in FIG. 17, a significant characteristic is shown in that, when the input mutual information amount is 1.0, the value of the output mutual information amount (this value is hereinafter referred to an ending point) becomes larger by performing deletion of a frequency band. Moreover, it can be seen that the value of the ending point rises as the deletion percentage increases. The input mutual information amount being the value of 1.0 enables attainment of advance information with complete transmission information, which means that perfect interference prevention is realized. Hence, it is appropriate to say that the transmission characteristic is enhanced if the perfect interference prevention is realized in SC/MMSE turbo equalization. Moreover, the next characteristic shows that, when the input mutual information amount is 0.0, the value of the output mutual information amount (this value is hereinafter referred to as a starting point) becomes smaller. As with the characteristic described earlier, it can also be seen that the value of the starting point lowers as the deletion percentage of a frequency band increases.

Since the value of the starting point is directly connected to the transmission characteristic in the case where a receiver without an interference prevention function is employed, the fact that the transmission characteristic is deteriorated if no turbo equalization is utilized can be confirmed by this point. Even when turbo equalization is utilized, lowering of the starting point may prevent secure convergence of the EXIT chart, possibly causing deterioration in the transmission characteristic. If, however, the decoder's EXIT characteristic is appropriately changed in accordance with lowering of the starting point to secure convergence, the advantage of the ending point rising, which was described earlier, may be utilized to improve the transmission characteristic.

As it approaches the ending point by repeating processes, data may be more accurately restored by turbo equalization. When the series of the dotted line and black circles with the deletion percentage of 25% is compared with that of the dotted line and black triangles with the deletion percentage of 50%, the dotted line and black circles with the deletion percentage of 25% has a better characteristic in a stage where it has not reached the ending point. Thus, the series of the dotted line and black triangles with the deletion percentage of 50%, which has a lower characteristic, may not reach the ending point depending on a modulation scheme or a coding rate. To prevent this from happening, Embodiment 3 is so configured that the modulation scheme or the coding rate is changed in accordance with the percentage of a use frequency band to be assigned to each data series or each transmission device 1 by the selection unit 28.

Figure 18:
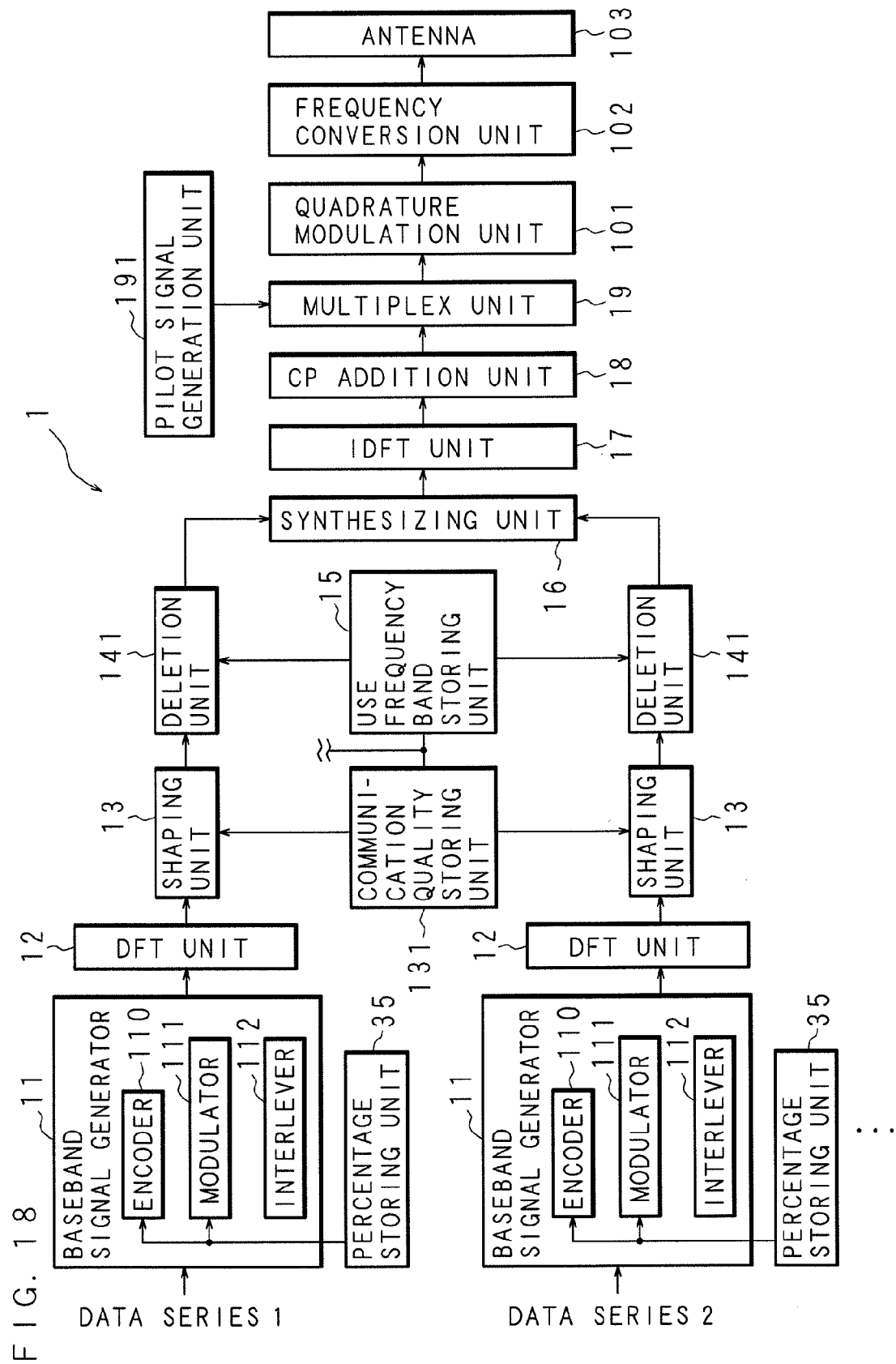
FIG. 18 is a block diagram illustrating the hardware configuration of a transmission device according to Embodiment 3.
Figure 19:
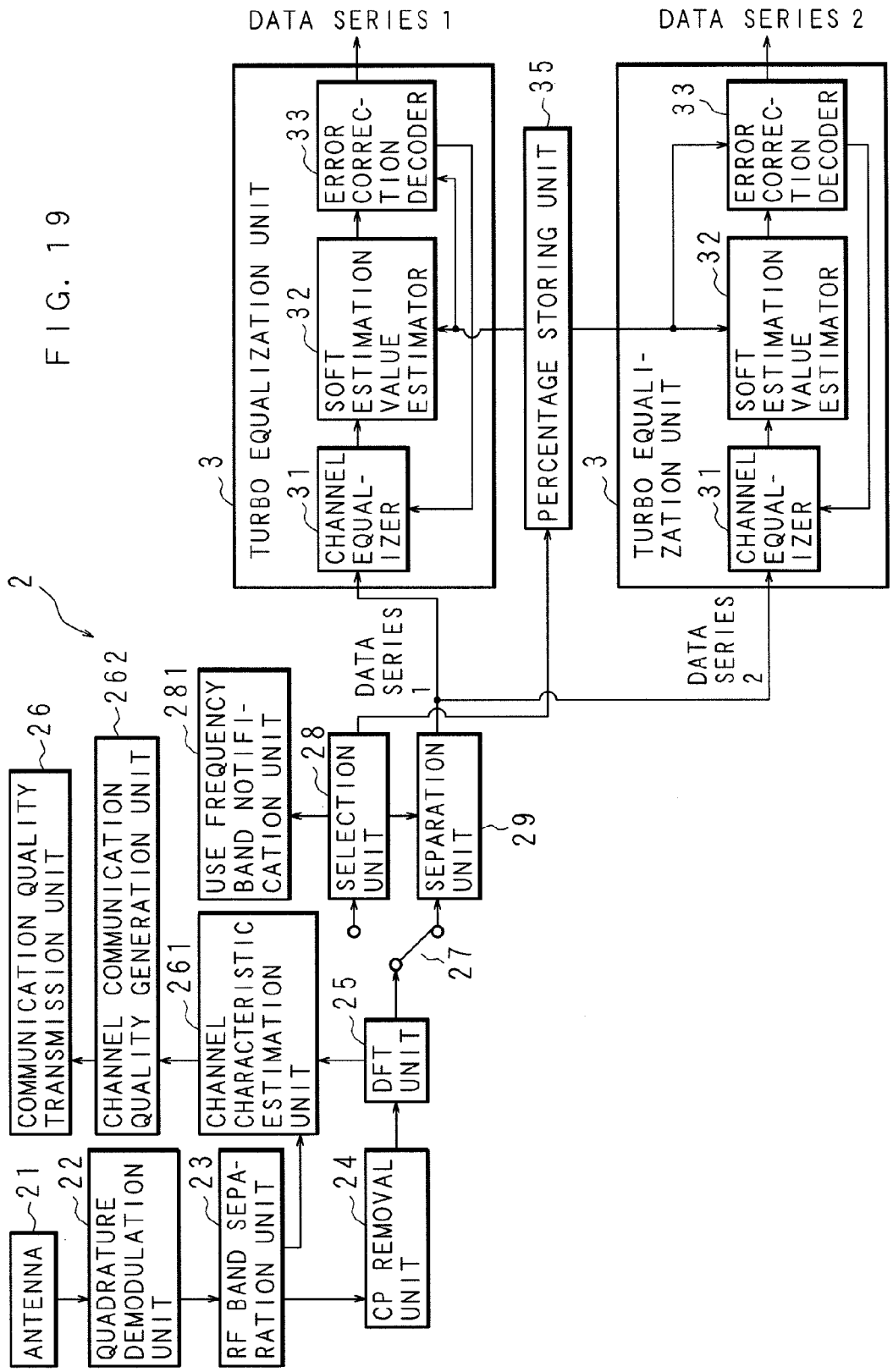
FIG. 19 is a block diagram illustrating the hardware configuration of a reception device according to Embodiment 3.

FIG. 18 is a block diagram illustrating the hardware configuration of the transmission device 1 according to Embodiment 3, whereas FIG. 19 is a block diagram illustrating the hardware configuration of the reception device 2 according to Embodiment 3. As illustrated in FIG. 18, the transmission device 1 is newly provided with percentage storing units 35, 35 as changing units, while the reception device 2 is also provided with a percentage storing unit 35 as a changing unit, as illustrated in FIG. 19. The percentage storing unit 35 in the reception device 2 is connected to the selection unit 28, and to the soft estimation value estimator 32 and the error correction decoder 33 of the turbo equalization unit 3. The selection unit 28 outputs a deletion percentage to the percentage storing unit 35. That is, the selection unit 28 outputs the deletion percentage, which is obtained by subtracting the percentage of a use frequency band to be used by each data series or each transmission device 1 from 100%, to the percentage storing unit 35. For example, when there are two data series or when there are two transmission devices 1 as in Embodiment 2, the deletion percentage of 50% is output. Moreover, when there are four data series or when there are four transmission devices 1 as developed from Embodiment 2, for example, the deletion percentage of 25% is output.

FIG. 20 is an explanatory drawing illustrating a record layout of the percentage storing unit 35. The percentage storing unit 35 is configured including a deletion percentage field, a modulation scheme field and a coding rate field; storing a modulation scheme and a coding rate therein in accordance with a deletion percentage. If, for example, the deletion percentage is 25%, QPSK for the modulation scheme and ½ for the coding rate are stored. Meanwhile, if the deletion percentage is 50% at which a larger number of frequency bins are deleted, different data, that is BPSK for the modulation scheme and ¼ for the coding rate, is stored so as to lower the modulation scheme and the coding rate.

The percentage storing unit 35 in the reception device 2 reads out the corresponding modulation scheme and coding rate from the percentage storing unit 35 based on the deletion percentage output from the selection unit 28, and outputs them to the soft estimation value estimator 32 and the error correction decoder 33. The soft estimation value estimator 32 performs demodulation in accordance with the modulation scheme output from the percentage storing unit 35, while the error correction decoder 33 performs decoding in accordance with the output coding rate.

Since the deletion percentage output from the selection unit 28 corresponds to a use frequency band, the deletion percentage is sent to the percentage storing units 35, 35 in the transmission device 1 via the use frequency band notification unit 281. Note that, when a plurality of transmission devices 1 exist as in Embodiment 2, the deletion percentage is sent to the percentage storing unit 35 placed in each of the transmission devices 1. It may also be possible that, instead of sending the deletion percentage, the deletion percentage is calculated based on the use frequency band stored in the use frequency band storing unit 15 in the transmission device 1 and output to the percentage storing unit 35 in the transmission device 1.

The percentage storing unit 35 in the transmission device 1 is connected to the encoder 110 and the modulator 111 of the baseband signal generator 11 in each of the data series. The percentage storing unit 35 reads out the corresponding modulation scheme in accordance with the deletion percentage based on the selection by the selection unit 28, and outputs the read-out modulation scheme to the modulator 111. The modulator 111 performs modulation in accordance with the output modulation scheme. Moreover, the percentage storing unit 35 reads out the corresponding coding rate in accordance with the deletion percentage based on the selection by the selection unit 28, and outputs the read-out coding rate to the encoder 110. The encoder 110 performs an encoding process in accordance with the output coding rate. Note that this can also be applied to Embodiment 2, which relates to a plurality of transmission devices 1, by connecting the percentage storing unit 35 to the encoder 110 and the modulator 111 of the baseband signal generator 11 in each of the transmission devices 1.

Embodiment 3 is configured as described above while the other configurations and functions are similar to those in Embodiments 1 and 2, so that the corresponding parts are provided with the same reference numbers and will not be described in detail.

Embodiment 4

Figure 22:
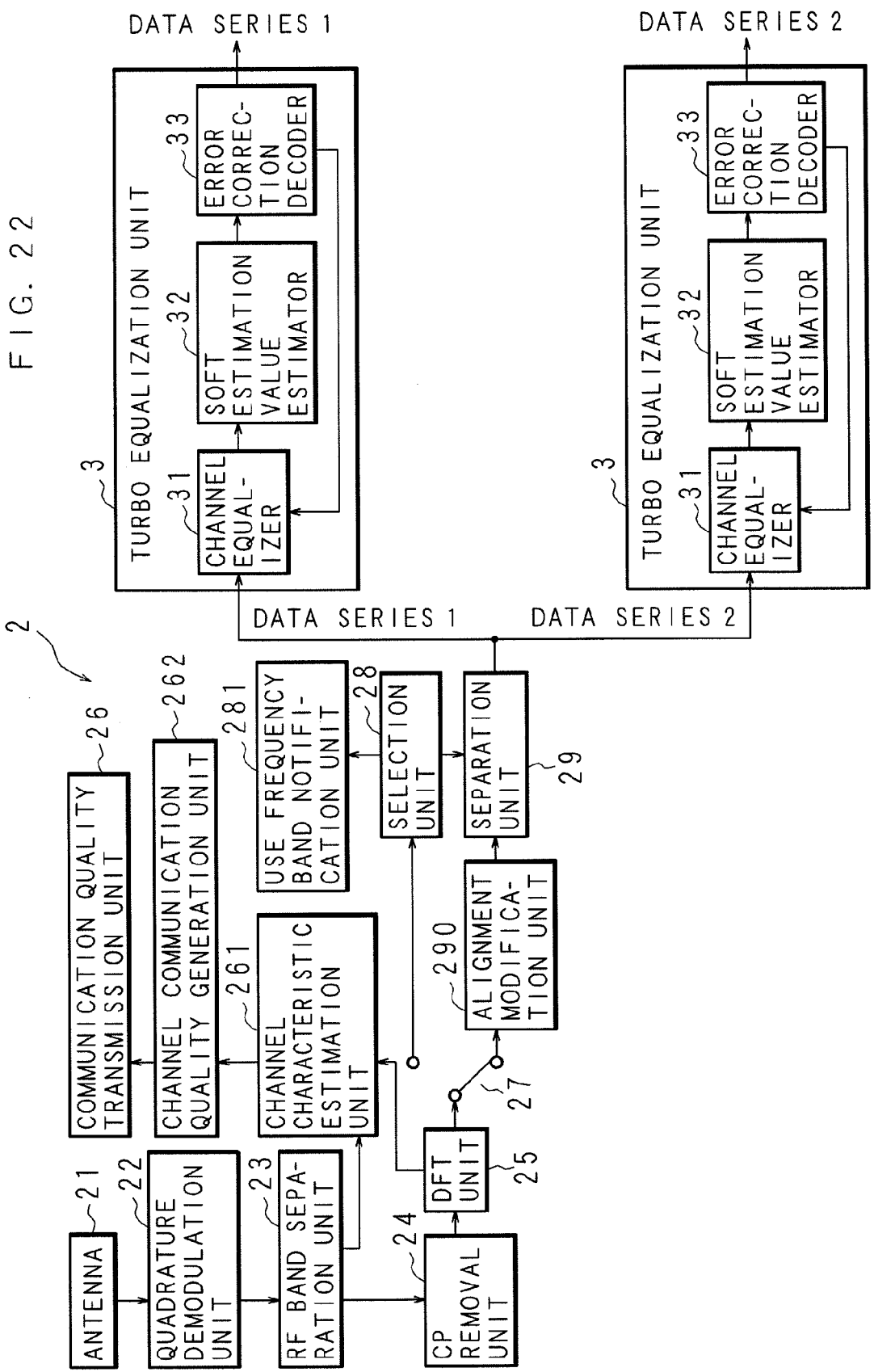
FIG. 22 is a block diagram illustrating the hardware configuration of a reception device according to Embodiment 4.

Embodiment 4 relates to a form wherein spectra are rearranged to enhance the security level. FIG. 21 is a block diagram illustrating the hardware configuration of the transmission device 1 according to Embodiment 4, whereas FIG. 22 is a block diagram illustrating the hardware configuration of the reception device 2 according to Embodiment 4. As illustrated in FIG. 21, an alignment conversion unit 160 is newly placed between the synthesizing unit 16 and the IDFT unit 17 in addition to the configuration of the transmission device 1 in Embodiment 1. Moreover, as illustrated in FIG. 22, an alignment modification unit 290 is newly placed at a preceding stage to the separation unit 29 in addition to the configuration of the reception device 2 in Embodiment 2.

After the energy of delete frequency bins is deleted by the deletion units 141, 141, the synthesizing unit 16 synthesizes the spectrum of use frequency bins for each data series. The synthesized spectrum of the frequency bins (all use frequency bands) is output to the alignment conversion unit 160. The alignment conversion unit 160 is provided with a memory (not illustrated) therein, performing a process of rearranging the alignment of the synthesized frequency bins in accordance with a rule stored in the memory. For example, while there are frequency bins 1 to 10 in the example of FIG. 5, a process of rearranging is performed by shifting three frequency bins at once. It is noted that the alignment arranging method described above is a mere example, and other appropriate methods may be employed such that frequency bins in a low frequency band are switched with frequency bins in a high frequency band.

The spectrum for which the alignment of frequency bins is rearranged is input to the IDFT unit 17 and then sent to the reception device 2. The spectrum, for which the alignment of frequency bins is rearranged, that is output from the DFT unit 25 in the reception device 2, is input to the alignment modification unit 290. The alignment modification unit 290 is also provided with a memory (not illustrated) as in the alignment conversion unit 160, the memory storing a rule corresponding to the rule stored in the memory in the alignment conversion unit 160. That is, when the alignment conversion unit 160 stores that the alignment of frequency bins is shifted by three bins to the direction of a higher frequency band, the alignment modification unit 290 stores, corresponding thereto, that the alignment is shifted back by three frequency bins to the direction of a lower frequency band. The alignment modification unit 290 performs rearrangement of the alignment of frequency bins, to output the spectrum of the shifted-back frequency bins to the separation unit 29.

FIG. 23 is a flowchart illustrating the procedure of the rearranging process. The deletion unit 141 deletes energy of a frequency band other than a use frequency band (step S231). The spectrum for which the energy of a part of frequency bands is deleted by the deletion unit 141 is input to the synthesizing unit 16 for each data series. The synthesizing unit 16 synthesizes the spectrum of a frequency band for each data series (step S232). The synthesized spectrum of a frequency band is output to the alignment conversion unit 160. The alignment conversion unit 160 reads out the stored rule to rearrange the alignment of the spectrum of a frequency band in accordance with the rule (step S233).

The spectrum of a frequency band after the alignment rearrangement goes through the processes from the IDFT unit 17 on, and is sent to the reception device 2 (step S234). The reception device 2 receives the spectrum of a frequency band for which the alignment is rearranged (step S235). The spectrum of a frequency band, which passed through the DFT unit 25 and the switch 27, and for which the alignment is rearranged, is input to the alignment modification unit 290. The alignment modification unit 290 reads out the stored rule to rearrange the alignment of the spectrum of a frequency band in accordance with the read-out rule (step S236). The spectrum of a frequency band for which the alignment is rearranged is input to the separation unit 29. The separation unit 29 separates the spectrum of a frequency band with reference to the use frequency band for each data series (step S237).

Embodiment 4 is configured as described above while the other configurations and functions are similar to those in Embodiments 1 to 3, so that the corresponding parts are provided with the same reference numbers and will not be described in detail.

What is claimed is:

1. A transmission method for sending a modulated digital signal from a transmission device to a reception device, comprising:
converting the modulated digital signal into a spectrum of a frequency band by a conversion unit in said transmission device;
notifying the transmission device of a frequency band to be used from said reception device;
deleting, by a deletion unit, a spectrum of a band other than the notified use frequency band;
sending a digital signal for a spectrum obtained after deletion from said transmission device to said reception device;
converting the sent digital signal into a spectrum of a frequency band by a reception side conversion unit;
performing non-linear iterative equalization, by an equalization unit, on the converted spectrum;
performing shaping, by a shaping unit, of the spectrum of each frequency band converted at said conversion unit, based on a communication status between the transmission device and the reception device;
wherein:
a use frequency band is selected, by a selection unit in said reception device, for each transmission device based on the energy of frequency bands sent from a plurality of transmission devices,
a use frequency band is selected, by said selection unit, for each data series based on energy distribution of a propagation channel frequency characteristic through which a plurality of data series sent from the transmission device pass,
each of corresponding transmission devices is notified of the use frequency band for each transmission device selected by said selection unit, and the use frequency band for each data series selected by said selection unit, the use frequency band for each transmission device is selected by said selection unit in the order of decreasing energy among the energy of frequency bands sent from a plurality of transmission devices, so as to avoid overlapping of a use frequency band to be selected among the transmission devices, the use frequency band for each data series is selected by said selection unit in the order of decreasing energy based on energy distribution of a propagation channel frequency characteristic, through which a plurality of data series sent from a transmission device pass, so as to avoid overlapping of a use frequency band to be selected among data series, the spectrum of a frequency band converted by said reception side conversion unit is separated, by a separation unit in said reception device, for each data series or for each transmission device, based on the use frequency band selected by said selection unit, said non-linear iterative equalization, performed by said equalization unit, is performed on the spectrum separated by said separation unit, said shaping is performed, by said shaping unit, using a water filling principal in which a larger energy of a spectrum of each frequency band converted at said conversion unit is distributed to a frequency band with better communication status between the transmission device and the reception device, and said transmission method further comprises changing, by a changing unit, a modulation scheme or a coding rate in accordance with a percentage of a use frequency band to be assigned to each data series or each transmission device, selected by said selection unit.

2. A transmission system for sending a modulated digital signal from a transmission device to a reception device, comprising:

a conversion unit converting the modulated digital signal into a spectrum of a frequency band in said transmission device;

a use frequency band notification unit notifying the transmission device of a frequency band to be used from said reception device;

a deletion unit deleting a spectrum of a band other than the use frequency band notified by the use frequency band notification unit;

a transmission unit sending a digital signal for a spectrum obtained after deletion by the deletion unit from said transmission device to said reception device;

a reception side conversion unit converting the digital signal sent by the transmission unit into a spectrum of a frequency band;

an equalization unit performing non-linear iterative equalization on the spectrum converted by the reception side conversion unit; and a shaping unit performing shaping of each frequency band converted at said conversion unit, based on a communication status between the transmission device and the reception device, wherein:

said reception device includes a selection unit selecting a use frequency band for each transmission device based on the energy of frequency bands sent from a plurality of transmission devices, and selecting a use frequency band for each data series based on energy distribution of a propagation channel frequency characteristic through which a plurality of data series sent from the transmission device pass, said use frequency band notification unit notifies each of corresponding transmission devices of the use frequency band for each transmission device selected by said selection unit, and the use frequency band for each data series selected by said selection unit, said selection unit selects the use frequency band for each transmission device in the order of decreasing energy among the energy of frequency bands sent from a plurality of transmission devices, so as to avoid overlapping of a use frequency band to be selected among the transmission devices, said selection unit selects the use frequency band for each data series in the order of decreasing energy based on energy distribution of a propagation channel frequency characteristic, through which a plurality of data series sent from a transmission device pass, so as to avoid overlapping of a use frequency band to be selected among data series, said reception device includes a separation unit separating the spectrum of a frequency band converted by said reception side conversion unit, for each data series or for each transmission device, based on the use frequency band selected by said selection unit, said equalization unit performs non-linear iterative equalization on the spectrum separated by said separation unit, said shaping unit performs shaping using a water filling principal in which a larger energy of a spectrum of each frequency band converted at said conversion unit is distributed to a frequency band with better communication status between the transmission device and the reception device, and said transmission system further comprises a changing unit changing a modulation scheme or a coding rate in accordance with a percentage of a use frequency band to be assigned to each data series or each transmission device, selected by said selection unit.

3. The transmission system according to claim 2, wherein said transmission unit synthesizes a spectrum for each data series obtained after deletion by said deletion unit, and sends a digital signal for the synthesized spectrum from said transmission device to said reception device.

4. A transmission device for sending a modulated digital signal to an outside, comprising:

a conversion unit converting the modulated digital signal into a spectrum of a frequency band;

a use frequency band storing unit storing a use frequency band to be used among frequency bands;

a deletion unit deleting a spectrum of a band other than the use frequency band stored in the use frequency band storing unit;

a transmission unit sending a digital signal for a spectrum obtained after deletion by the deletion unit to an outside; and a shaping unit performing shaping of the spectrum of each frequency band converted at said conversion unit, based on a communication status between the transmission device and the reception device, wherein said shaping unit performs shaping using a water filling principal in which a larger energy of a spectrum of each frequency band converted at said conversion unit is distributed to a frequency band with better communication status between the transmission device and the reception device.

5. The transmission device according to claim 4, wherein
said use frequency band storing unit stores a use frequency band for each data series selected from a plurality of data series, and
said transmission unit synthesizes a spectrum of each data series, obtained after deletion by said deletion unit, and sends a digital signal for the synthesized spectrum from said transmission device to said reception device.

* * * * *